(12) United States Patent
Yoshizawa

(10) Patent No.: US 10,979,945 B2
(45) Date of Patent: Apr. 13, 2021

(54) DEVICE TO REDUCE CONSUMPTION OF RADIO RESOURCES OF A MACROCELL

(71) Applicant: SONY CORPORATION, Tokyo (JP)

(72) Inventor: Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 36 days.

(21) Appl. No.: 15/126,100

(22) PCT Filed: Feb. 2, 2015

(86) PCT No.: PCT/JP2015/052859
§ 371 (c)(1),
(2) Date: Sep. 14, 2016

(87) PCT Pub. No.: WO2015/146285
PCT Pub. Date: Oct. 1, 2015

(65) Prior Publication Data
US 2017/0078931 A1    Mar. 16, 2017

(30) Foreign Application Priority Data

Mar. 25, 2014    (JP) .............................. JP2014-061604

(51) Int. Cl.
*H04W 36/00*    (2009.01)
*H04W 36/04*    (2009.01)
(Continued)

(52) U.S. Cl.
CPC ... *H04W 36/0072* (2013.01); *H04W 36/0069* (2018.08); *H04W 36/0083* (2013.01);
(Continued)

(58) Field of Classification Search
CPC ......... H04W 36/0072; H04W 36/0083; H04W 36/04; H04W 52/0212; H04W 72/005
See application file for complete search history.

(56) References Cited

U.S. PATENT DOCUMENTS

2011/0007657 A1* 1/2011 Kazmi ................. H04J 11/0093
370/252
2012/0044922 A1* 2/2012 Ishii ........................ H04L 5/001
370/338

(Continued)

FOREIGN PATENT DOCUMENTS

JP    2012-520633 A    9/2012
WO    2009/054086 A    4/2009
(Continued)

OTHER PUBLICATIONS

Extended European Search Report of EP Application No. 15768871.4, dated Oct. 2, 2017, 11 pages of EESR.

(Continued)

*Primary Examiner* — Christopher M Crutchfield
*Assistant Examiner* — Tito Q Pham
(74) *Attorney, Agent, or Firm* — Chip Law Group

(57) ABSTRACT

There is provided a device including an acquisition unit configured to acquire a measurement result reported by a terminal device using an uplink component carrier (CC) and a downlink CC of a macrocell as an uplink primary component carrier (PCC) and a downlink PCC for the terminal device, and a control unit configured to decide handover in which at least one of the uplink PCC and the downlink PCC is changed based on the measurement result.

19 Claims, 22 Drawing Sheets

(51) Int. Cl.
*H04W 52/02* (2009.01)
*H04W 72/00* (2009.01)
*H04W 36/28* (2009.01)

(52) U.S. Cl.
CPC ..... *H04W 36/00837* (2018.08); *H04W 36/04* (2013.01); *H04W 52/0212* (2013.01); *H04W 72/005* (2013.01); *H04W 36/28* (2013.01); *Y02D 30/70* (2020.08)

(56) References Cited

U.S. PATENT DOCUMENTS

| | | | | |
|---|---|---|---|---|
| 2012/0051260 A1* | 3/2012 | Tamaki | ................ | H04W 24/02 370/253 |
| 2012/0077445 A1* | 3/2012 | Konno | ................ | H04L 5/001 455/67.11 |
| 2012/0250557 A1* | 10/2012 | Zirwas | ............. | H04W 72/1231 370/252 |
| 2014/0003392 A1* | 1/2014 | Yang | ................ | H04L 5/001 370/331 |
| 2014/0198715 A1* | 7/2014 | Zasowski | ............. | H04W 16/26 370/315 |
| 2014/0211756 A1* | 7/2014 | Bontu | ................ | H04W 36/04 370/331 |
| 2014/0235246 A1* | 8/2014 | Lin | ................ | H04W 36/0088 455/436 |
| 2014/0348050 A1* | 11/2014 | Kim | ................ | H04W 72/0446 370/312 |
| 2015/0057002 A1* | 2/2015 | Lee | ................ | H04W 36/06 455/437 |
| 2015/0365872 A1* | 12/2015 | Dudda | ............. | H04W 36/0055 455/436 |
| 2016/0014662 A1* | 1/2016 | Yiu | ................ | H04W 4/90 455/436 |
| 2016/0029321 A1* | 1/2016 | Hwang | ................ | H04J 11/005 455/450 |
| 2016/0073345 A1* | 3/2016 | Fan | ................ | H04W 68/005 370/311 |
| 2016/0105818 A1* | 4/2016 | Lu | ................ | H04W 24/10 370/229 |
| 2016/0113052 A1* | 4/2016 | Worrall | ................ | H04B 7/155 455/450 |
| 2016/0174124 A1* | 6/2016 | Basu Mallick | ... | H04W 36/0072 370/331 |
| 2017/0295054 A1* | 10/2017 | Lee | ................ | H04L 41/06 |

FOREIGN PATENT DOCUMENTS

| | | |
|---|---|---|
| WO | 2009/054086 A1 | 4/2009 |
| WO | 2010/126105 A | 11/2010 |
| WO | 2010/126105 A1 | 11/2010 |
| WO | 2010/140347 A | 12/2010 |
| WO | 2010/140347 A1 | 12/2010 |
| WO | 2013/183766 A1 | 12/2013 |

OTHER PUBLICATIONS

Office Action for JP Patent Application No. 2016-510093, dated Mar. 12, 2019, 03 pages of Office Action and 04 pages of English Translation.

Office Action for JP Patent Application No. 2016-510093, dated Oct. 29, 2019, 03 pages of Office Action and 02 pages of English Translation.

* cited by examiner

FIG. 4

| | SAI 0-1 | |
|---|---|---|
| mbms-SAI-Intrafreq | SAI 0-2 | |
| | ⋮ | |
| mbms-SAI-Interfreq LIST | ARFCN 1 | SAI 1-1 |
| | | SAI 1-2 |
| | | ⋮ |
| | ARFCN 2 | SAI 2-1 |
| | | SAI 2-1 |
| | | ⋮ |
| | ⋮ | |

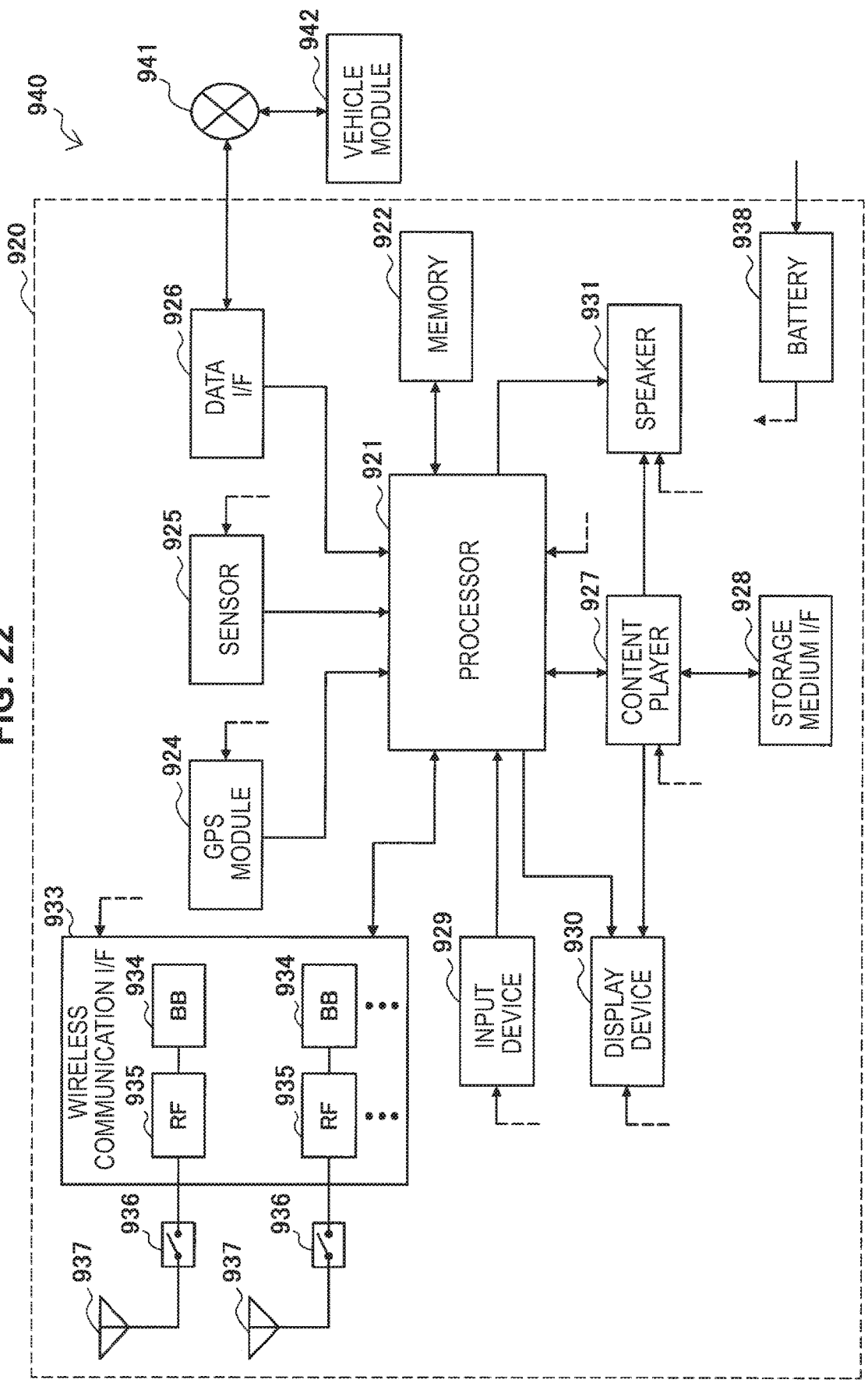

DEVICE TO REDUCE CONSUMPTION OF RADIO RESOURCES OF A MACROCELL

CROSS REFERENCE TO RELATED APPLICATIONS

This application is a U.S. National Phase of International Patent Application No. PCT/JP2015/052859 filed on Feb. 2, 2015, which claims priority benefit of Japanese Patent Application No. JP 2014-061604 filed in the Japan Patent Office on Mar. 25, 2014. Each of the above-referenced applications is hereby incorporated herein by reference in its entirety.

TECHNICAL FIELD

The present disclosure relates to a device.

BACKGROUND ART

The $3^{rd}$ Generation Partnership Project (3GPP) has standardized 4G wireless communication systems. With regard to 4G, technologies such as carrier aggregation, relay, multi-user multiple-input multiple-output (MU-MIMO), and the like have gained attention.

Particularly, carrier aggregation is a technology for aggregating, for example, 5 frequency bands each having a bandwidth of 20 MHz at maximum to deal with a bandwidth of 20 MHz×5=100 MHz. According to this carrier aggregation, throughput is expected to improve to the maximum. Various technologies relating to this carrier aggregation have been examined.

For example, Patent Literature 1 discloses unidirectional handover in carrier aggregation in which only one of a downlink carrier and an uplink carrier is changed from a carrier of a certain base station to a carrier of another base station.

CITATION LIST

Patent Literature

Patent Literature 1: US Patent Application Publication No. 2010/0234037

SUMMARY OF INVENTION

Technical Problem

In the technology disclosed in Patent Literature 1 mentioned above, however, when carrier aggregation is performed between base stations on a heterogeneous network (HetNet) including a macrocell and a small cell, for example, consumption of radio resources of the macrocell can increase.

Specifically, when carrier aggregation is performed between base stations on a HetNet, for example, it is generally assumed that a component carrier (CC) of a macrocell is used as a primary component carrier (PCC) and a CC of a small cell is used as a secondary component carrier (SCC) in consideration of mobility of a terminal device. Particularly, when FDD is employed and only a downlink band is allocated to a small cell (i.e., all CCs of the small cell are downlink CCs), the downlink CCs of the small cell are assumed to be used as downlink SCCs. In such a case, downlink CCs of a macrocell are used as downlink PCCs, and the downlink CCs are used to transmit control information and the like. That is, radio resources of the macrocell can be consumed. Even when a terminal device is not moving for a while, for example, radio resources of the macrocell can be consumed.

Therefore, it is desirable to provide a mechanism that can further reduce consumption of radio resources of a macrocell.

Solution to Problem

According to the present disclosure, there is provided a device including: an acquisition unit configured to acquire a measurement result reported by a terminal device using an uplink component carrier (CC) and a downlink CC of a macrocell as an uplink primary component carrier (PCC) and a downlink PCC for the terminal device; and a control unit configured to decide handover in which at least one of the uplink PCC and the downlink PCC is changed based on the measurement result. The control unit decides handover in which the downlink PCC is changed from the downlink CC of the macrocell to a downlink CC of a small cell without changing the uplink PCC when a predetermined condition is satisfied.

According to the present disclosure, there is provided a device including: a control unit configured to control transmission of a message for execution of handover in which a downlink PCC for a terminal device is changed from a downlink CC of a macrocell to a downlink CC of a small cell without changing an uplink PCC for the terminal device from an uplink CC of the macrocell to the terminal device.

According to the present disclosure, there is provided a device including: an acquisition unit configured to acquire a message for execution of handover in which a downlink PCC for a terminal device is changed from a downlink CC of a macrocell to a downlink CC of a small cell without changing an uplink PCC for the terminal device from an uplink CC of the macrocell, the message being transmitted from a base station to the terminal device; and a control unit configured to use the uplink CC of the macrocell as the uplink PCC and use the downlink CC of the small cell as the downlink PCC after execution of the handover.

Advantageous Effects of Invention

According to the present disclosure described above, it is possible to further reduce consumption of radio resources of a macrocell. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is an explanatory diagram for describing an example of information of SIB15.

FIG. 22 is a block diagram showing an example of a schematic configuration of a car navigation device.

DESCRIPTION OF EMBODIMENT(S)

Figure 1:
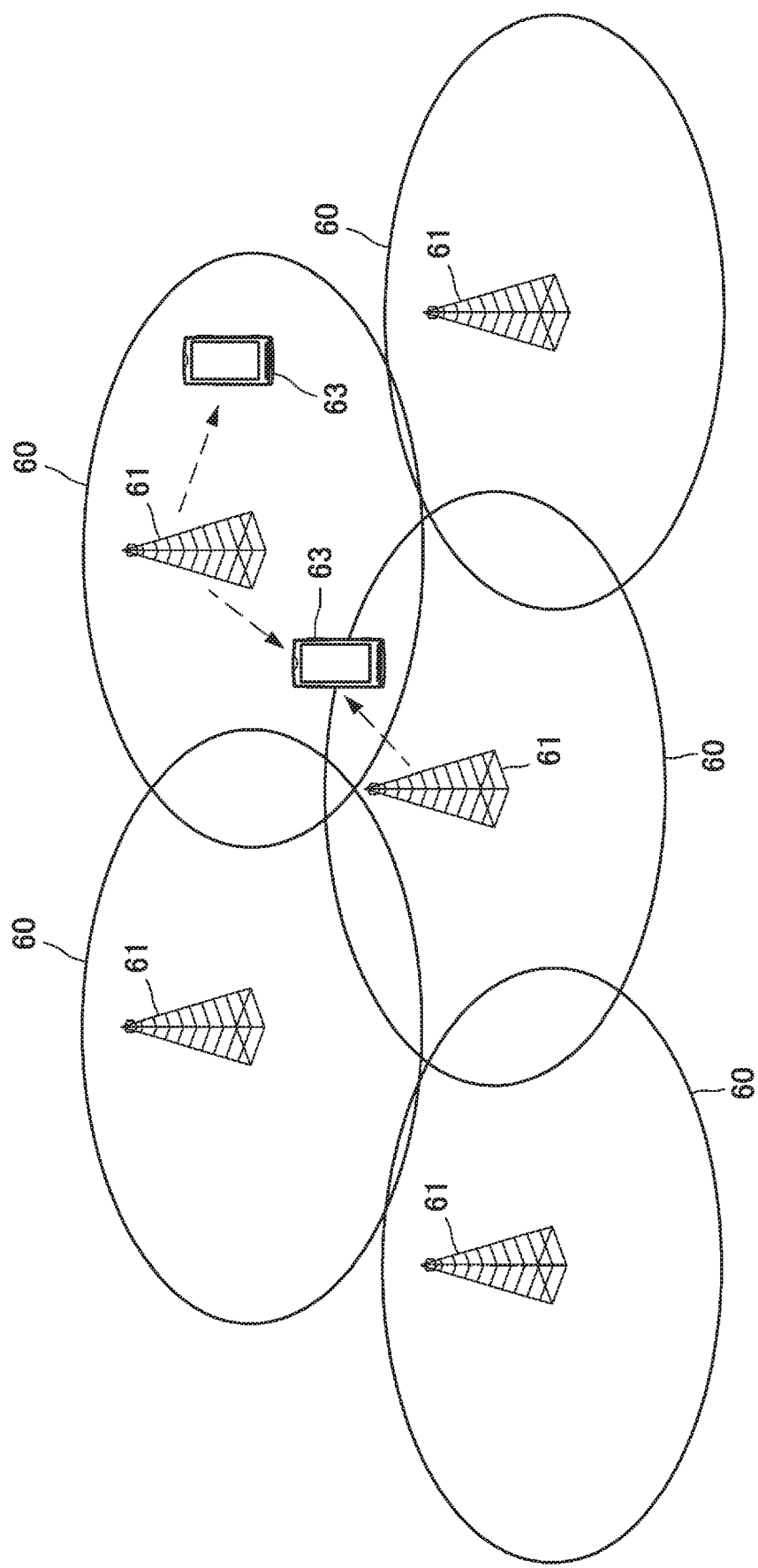
FIG. 1 is an illustrative diagram for describing an example of an MBSFN area.

Hereinafter, preferred embodiments of the present disclosure will be described in detail with reference to the appended drawings. In this specification and the drawings, elements that have substantially the same function and structure are denoted with the same reference signs, and repeated explanation is omitted.

Note that description will be provided in the following order.

1. Introduction
2. Schematic configuration of a communication system
3. Configuration of each device
3.1. Configuration of a macro base station
3.2. Configuration of a small base station
3.3. Configuration of a terminal device
4. Process flow
5. Modified example
6. Application examples
6.1. Application example for a base station
6.2. Application example for a terminal device
7. Conclusion

1. INTRODUCTION

First, Multimedia Broadcast Multicast Services (MBMS), a small cell, and handover will be described with reference to FIGS. 1 to 9.

(MBMS)
(a) MBSFN

The MBMS is a downlink scheme that can enhance frequency use efficiency. In the MBMS, a plurality of user equipments (UEs) receive the same information using the same downlink resources. The MBMS is suitable for informing a number of UEs of the same information. For example, the MBMS enables efficient video distribution of news, sports broadcasting, and the like.

In the MBMS, an area in which the same information is transmitted using the same radio resources is called an MBMS single frequency network (MBSFN) area. One or more cells belong to an MBSFN area. Each cell can belong to a maximum of 8 MBSFN areas. An example of an MBSFN area will be described with reference to FIG. 1.

FIG. 1 is an illustrative diagram for describing an example of an MBSFN area. Referring to FIG. 1, the MBSFN area that includes 5 cells 60 is shown. Each of evolved Node Bs (eNBs) 61 of the 5 cells 60 transmits the same information using the same radio resources. Accordingly, UEs 63 positioned within the MBSFN area receive the same information through the same radio resources. Note that a UE 63 positioned on a cell edge combines signals transmitted from 2 or more eNBs and thereby can obtain better communication quality.

In order to cause a UE to receive the MBMS services, an activation procedure of the MBMS multicast services is performed between the UE and a network. In the procedure, the network recognizes the UE and generates an MBMS-UE context.

(b) Subframe and Channel of an MBSFN
MBSFN Subframe

An MBSFN subframe used for the MBMS is informed in an MBSFN subframe configuration list of system information block (SIB) 2. A UE of Release 8 of the 3GPP recognizes an MBSFN subframe from SIB2.

MBSFN subframes are shown with a radio frame allocation period, a radio frame allocation offset, and subframe allocation. A specific example of MBSFN subframes will be described with reference to FIG. 2.

Figure 2:
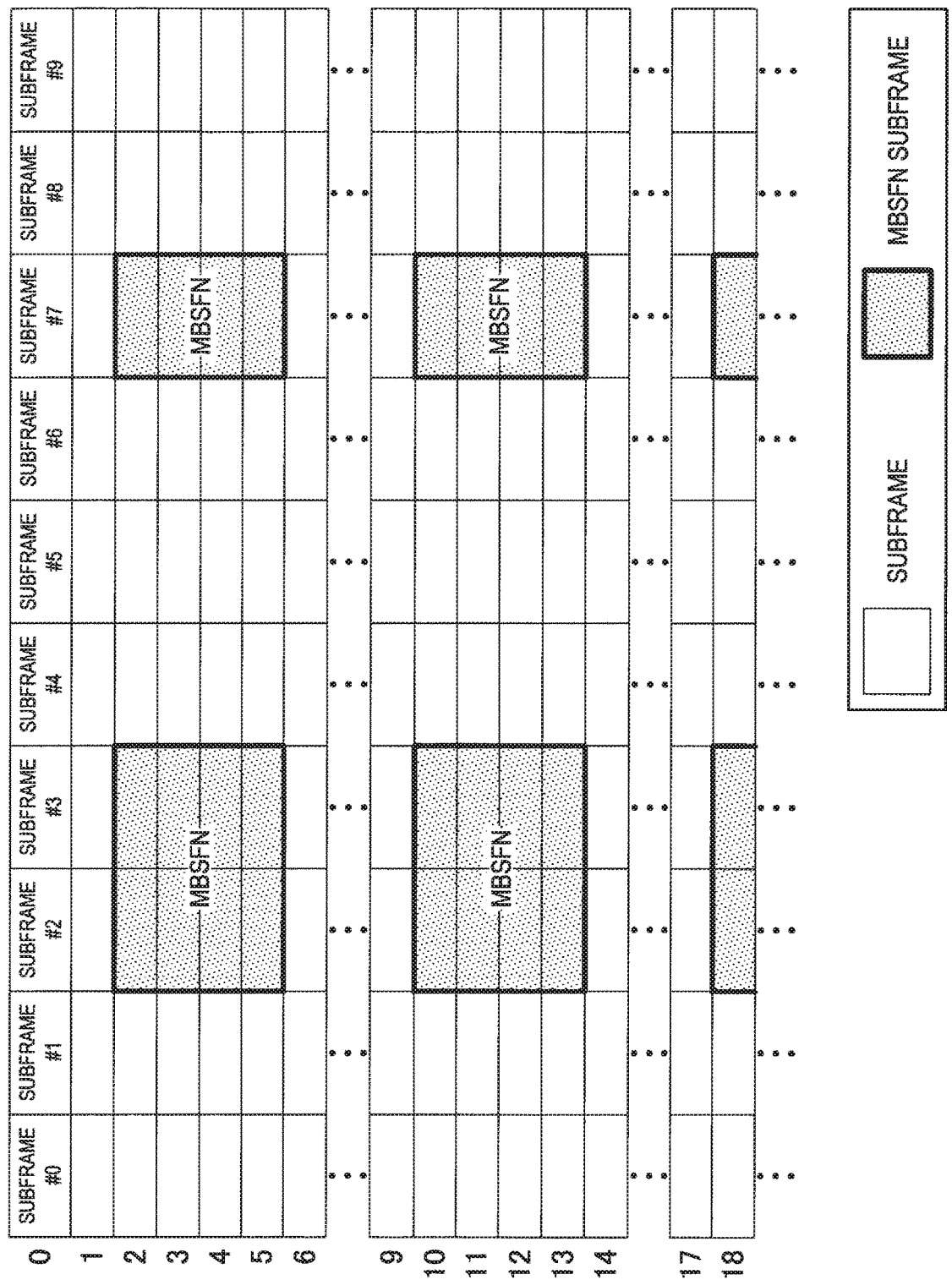
FIG. 2 is an illustrative diagram for describing an example of MBSFN subframes.

FIG. 2 is an illustrative diagram for describing the example of MBSFN subframes. Referring to FIG. 2, subframes included in radio frames of respective system frame numbers (SFN) are shown. In this example, the radio frame allocation period is 8, and the radio frame allocation offset is 2. In addition, the subframe allocation is 4 frame patterns (24 bits). Thus, the radio frames of SFNs satisfying "SFN mod 8=2" (i.e., SFNs such as 2, 10, and 18) and 3 radio frames following thereafter are radio frames for the MBSFN. In addition, in this example, Frequency Division Duplexing (FDD) is employed, and subframe allocation is "011010 011010 011010 011010." If FDD is employed, the bits of the subframe allocation indicate the subframes #1, #2, #3, #6, #7, and #8, and thus the subframes #2, #3, and #7 among the above-mentioned radio frames are MBSFN subframes.

MCCH

As logical channels in the MBMS, there are multicast control channels (MCCH) that are control channels and multicast traffic channels (MTCH) that are traffic channels. MCCHs provide information for accessing MTCHs.

An MCCH and an MTCH are mapped to the same transport channel (i.e., a multicast channel (MCH)) and the same physical multicast channel (PMCH)). Thus, it is necessary for a UE to distinguish an MCCH and a MTCH. Therefore, schedule information of the MCCH is provided in SIB13.

SIB13 indicates a subframe in which the MCCH is arranged and the like. More specifically, SIB13 includes an MCCH repetition period, an MCCH offset, subframe allocation information, and the like. A specific example of subframes in which MCCHs are arranged will be described below with reference to FIG. 3.

Figure 3:
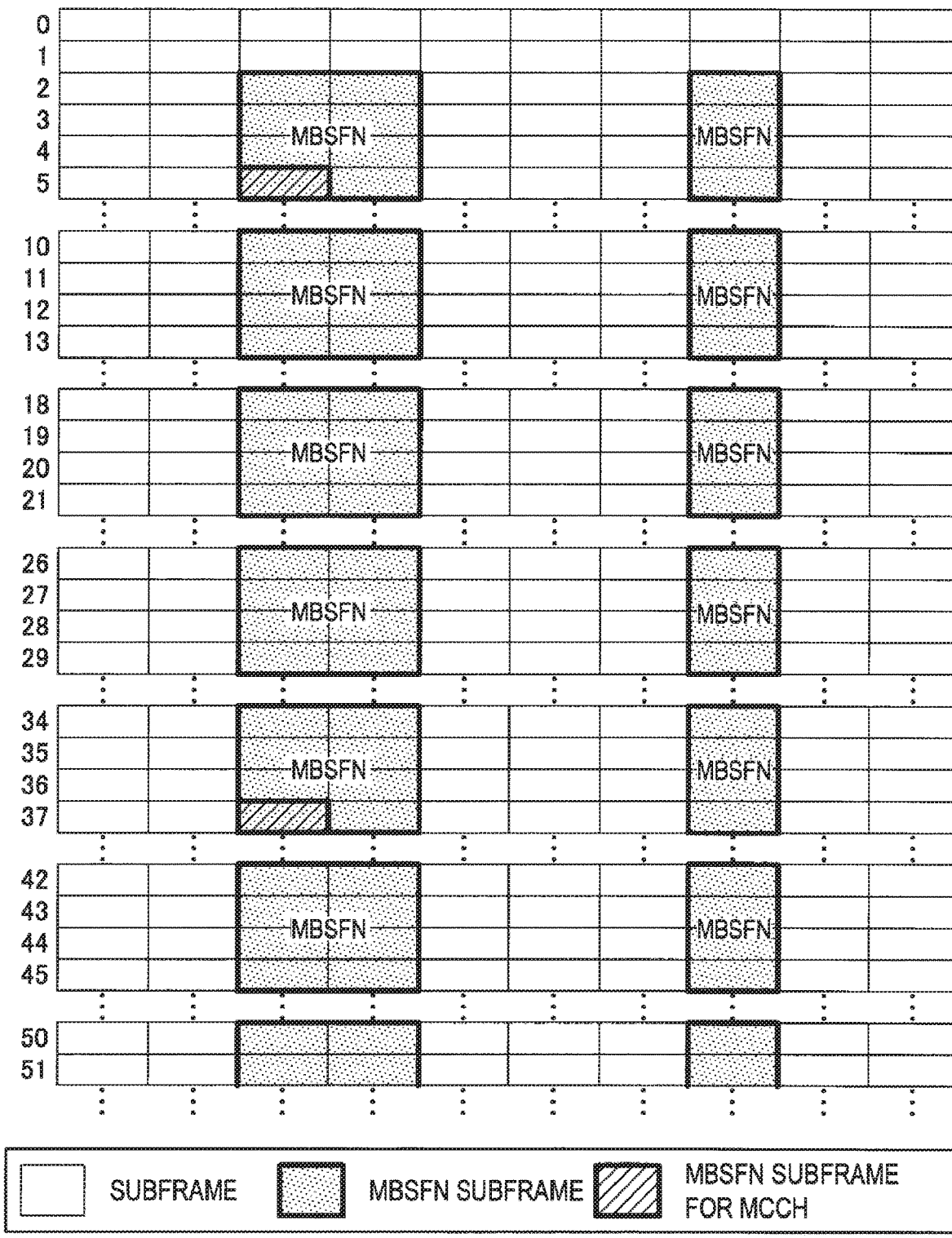
FIG. 3 is an explanatory diagram for describing an example of subframes in which MCCHs are arranged.

FIG. 3 is an explanatory diagram for describing the example of the subframes in which MCCHs are arranged. Referring to FIG. 3, the subframes included in radio frames of each SFN are shown. MBSFN subframes of this example are the same as the MBSFN subframes shown in FIG. 2. In this example, the MCCH repetition period is 32, and the MCCH offset is 5. Thus, the radio frames of SFNs satisfying "SFN mod 32=5" (i.e., SFNs including 5, 37, and the like) are radio frames in which MCCHs are arranged. Furthermore, in this example, subframe allocation information is "010000." If FDD is employed, the bits of subframe allocation indicate the subframes #1, #2, #3, #6, #7, and #8, and thus the subframes #2 among the above-mentioned radio frames are the subframes in which MCCHs are arranged. As described, MCCHs are periodically arranged in MBSFN subframes.

Note that SIB13 includes an MBSFN area ID, a non-MBSFN region length, a notification indicator, and the like. The MBSFN area ID indicates a maximum of 8 MBSFN areas. The non-MBSFN region length indicates an Orthogonal Frequency Division Multiplexing (OFDM) symbol on which no PMCH is arranged. The notification indicator indicates a bit of a PDCCH for notification of a change in an MCCH.

(c) SIB15

In Release 11 of the 3GPP, enhancement in service continuity of the MBMS has been discussed, and improvement of providing the MBMS using a plurality of frequencies has been added.

Specifically, mbms-SAI-InterFreqList and mbms-SAI-IntraFreq are defined in SIB15. mbms-SAI-IntraFreq includes a list of MBMS SAIs for current frequencies. In addition, mbms-SAI-InterFreqList includes a list of neighboring frequencies, and provides corresponding MBMS SAIs. An example of information of SIB15 will be described below with reference to FIG. 4.

FIG. 4 is an explanatory diagram for describing the example of information of SIB15. Referring to FIG. 4, mbms-SAI-IntraFreq and mbms-SAI-InterFreqList are shown. The mbms-SAI-IntraFreq includes a list of MBMS SAIs for current frequencies. The mbms-SAI-InterFreqList includes lists of absolute radio frequency channel numbers (ARFCNs) and MBMS SAIs for respective neighboring frequencies. The bit length of an SAI is 6 bits. In addition, the ARFCNs are numbers for identifying frequencies.

With SIB13, SAIs for current frequencies and neighboring frequencies are provided to terminal devices. Thus, service continuity of the MBMS can improve.

(d) MBMS Interest Indication

After acquiring SIB15, a UE transmits an MBMS interest indication message. The MBMS interest indication message includes an MBMS frequency list and MBMS priority. The MBMS frequency list is a list of MBMS frequencies on which the UE receives or is interested in receiving the MBMS via a Media Access Broker (MRB). The MBMS priority indicates whether the UE prioritizes reception of the MBMS over reception of unicast. When the UE prioritizes reception of MBMS over reception of unicast, the MBMS priority is true.

The MBMS interest indication message is transmitted by the UE in an RRC connection mode in several cases. For example, the MBMS interest indication message is transmitted in the case of advance to or exit from a service area, the case of a start or an end of a session, the case in which the UE desires a change of a frequency, the case in which the UE changes MBMS priority, and/or the case in which SIB15 is changed.

(e) User Service Description (USD)

In the MBMS, a node called a Broadcast-Multicast Service Center (BM-SC) provides a USD to a UE attempting to receive the MBMS. The USD includes information such as a start time and an end time of a session, and the UE uses this information when receiving services.

In addition, concentration of signaling within a cell when a session starts is considered. Thus, the USD includes parameters for avoiding such concentration. Specifically, the USD includes a protection period, a random time period, and the like.

(Small Cell)

At present, a standard for small cells is examined in Release 12 of the 3GPP. A small cell is a cell smaller than a macrocell, and relates to a technology for increasing a communication capacity of a cellular system.

(a) Carrier Aggregation Between eNBs

For example, different frequency bands are used between a macrocell and a small cell, and carrier aggregation between a macro eNB of the macrocell and a small eNB of the small cell is performed. That is, a UE performs dual connection with the two eNBs. Accordingly, for example, data communication becomes even faster, and tolerance to movement of the UE can further increase.

(b) Addition of an SCC

An Example of Addition of an SCC

When a UE uses a CC of a macrocell as a PCC, for example, a CC of a small cell is added thereto as an SCC of the UE. A specific example of this subject will be described below with reference to FIGS. 5 and 6.

Figure 5:
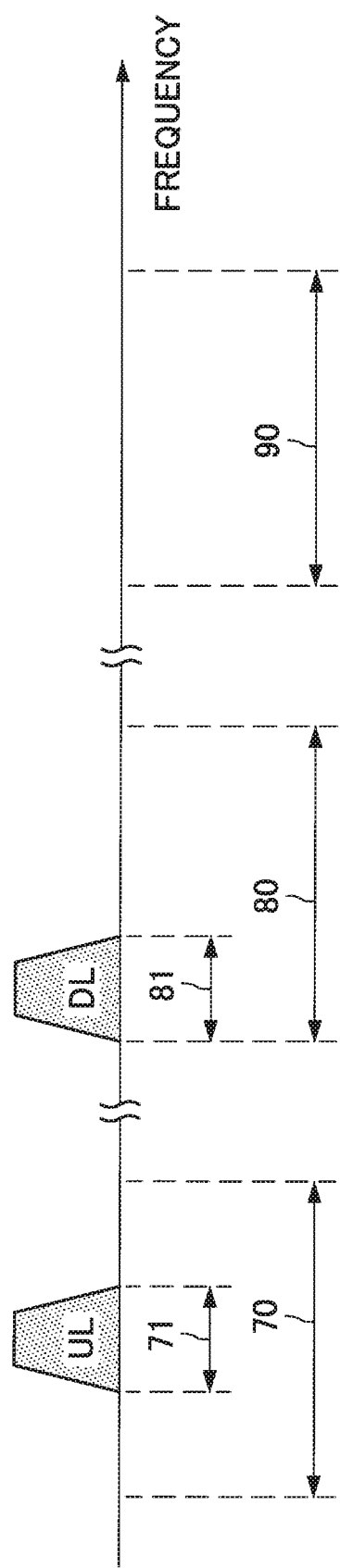
FIG. 5 is an illustrative diagram for describing an example of a state before addition of an SCC.

FIG. 5 is an illustrative diagram for describing an example of a state before addition of an SCC. Referring to FIG. 5, a UE uses an uplink CC 71 of an uplink band 70 for a macrocell as an uplink PCC. In addition, the UE uses a downlink CC 81 of a downlink band 80 for the macrocell as a downlink PCC.

Figure 6:
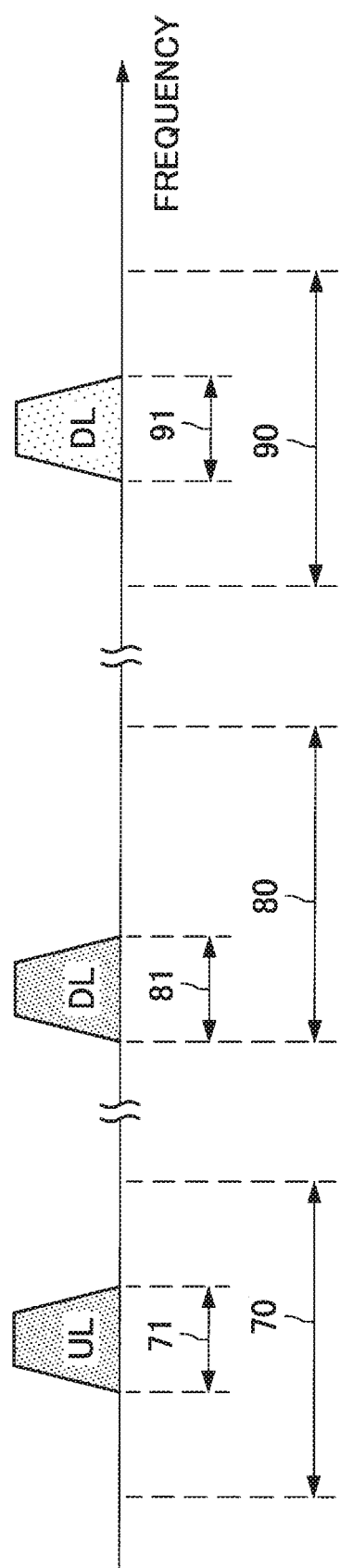
FIG. 6 is an illustrative diagram for describing an example of a state after addition of an SCC.

FIG. 6 is an illustrative diagram for describing an example of a state after addition of an SCC. Referring to FIG. 6, a downlink CC 91 of a downlink band 90 for a small cell, for example, is added as an SCC of the UE. As a result, the UE uses the uplink CC 71 and the downlink CC 81 as PCCs, and uses the downlink CC 91 as an SCC. Accordingly, for example, throughput in downlink improves.

Note that an SCC is also called a secondary cell (Scell). In addition, a PCC is also called a primary cell (Pcell).

SCC Addition Procedure

Figure 7:
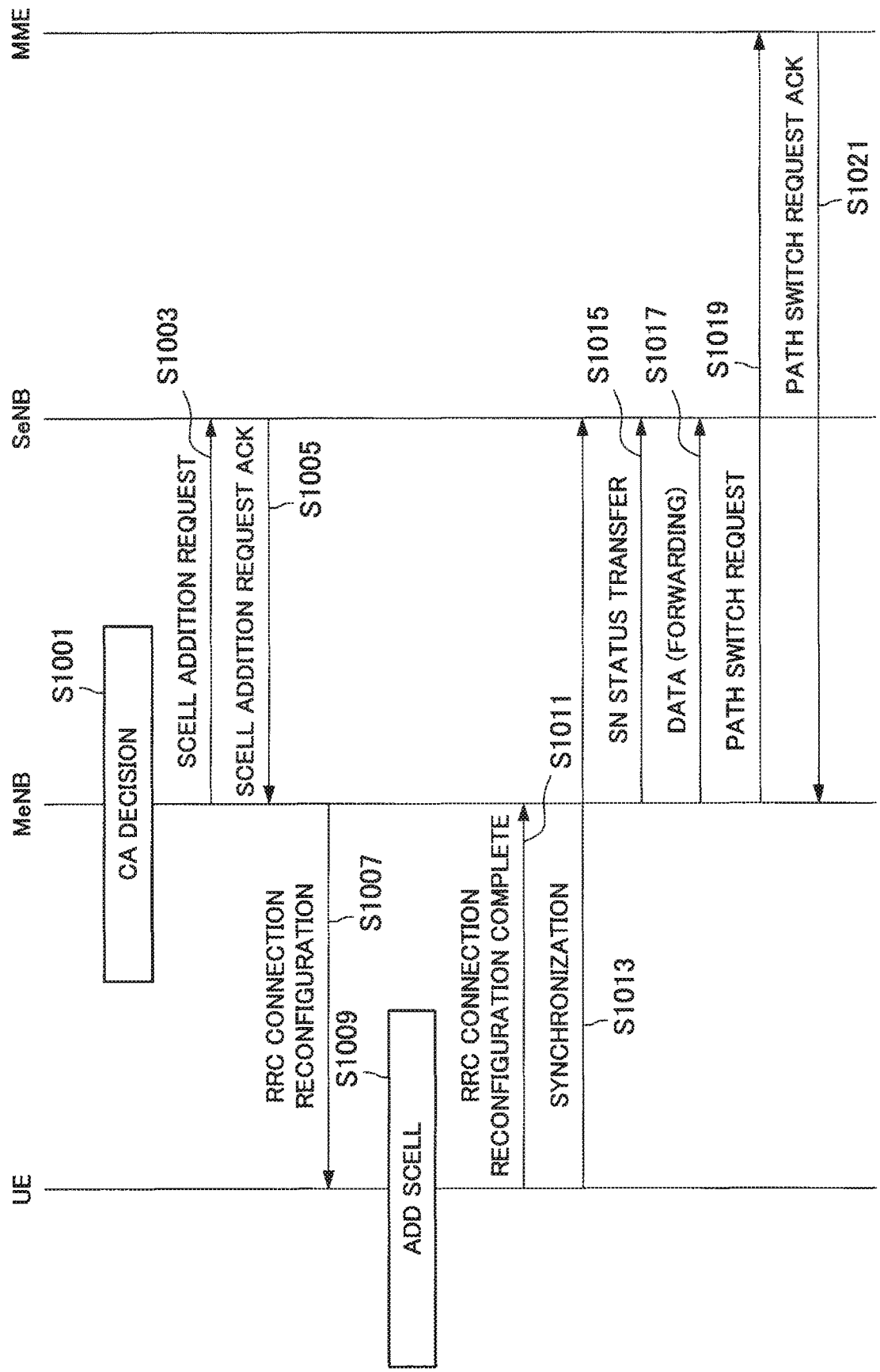
FIG. 7 is a sequence diagram showing an example of a schematic flow of an SCC addition procedure.

An example of the SCC addition procedure will be described below with reference to FIG. 7. FIG. 7 is a sequence diagram showing an example of a schematic flow of the SCC addition procedure.

First, a macro eNB (MeNB) decides carrier aggregation (CA) (S1001). Specifically, the MeNB decides addition of a CC of a small cell as an Scell of a UE. Then, the MeNB transmits an Scell addition request message to a small eNB (SeNB) (S1003). An Scell addition request acknowledgement (ACK) message is received from the SeNB (S1005).

Furthermore, the MeNB transmits an RRC connection reconfiguration message instructing addition of an Scell to the UE (S1007). Then, the UE adds a CC of the small cell as an Scell (S1009), and transmits an RRC connection reconfiguration complete message to the MeNB (S1011).

Further, the UE achieves synchronization with the Scell (S1013). Then, transmission of a sequence number (SN) status transfer message from the MeNB to the SeNB (S1015), forwarding of data from the MeNB to the SeNB (S1017), transmission of a path switch request message from the MeNB to an MME (S1019), transmission of a path switch request ACK message from the MME to the MeNB (S1021), and the like are performed.

(Handover)

A change of a PCC is performed through a handover procedure. An example of the handover procedure will be described below with reference to FIG. 8.

Figure 8:
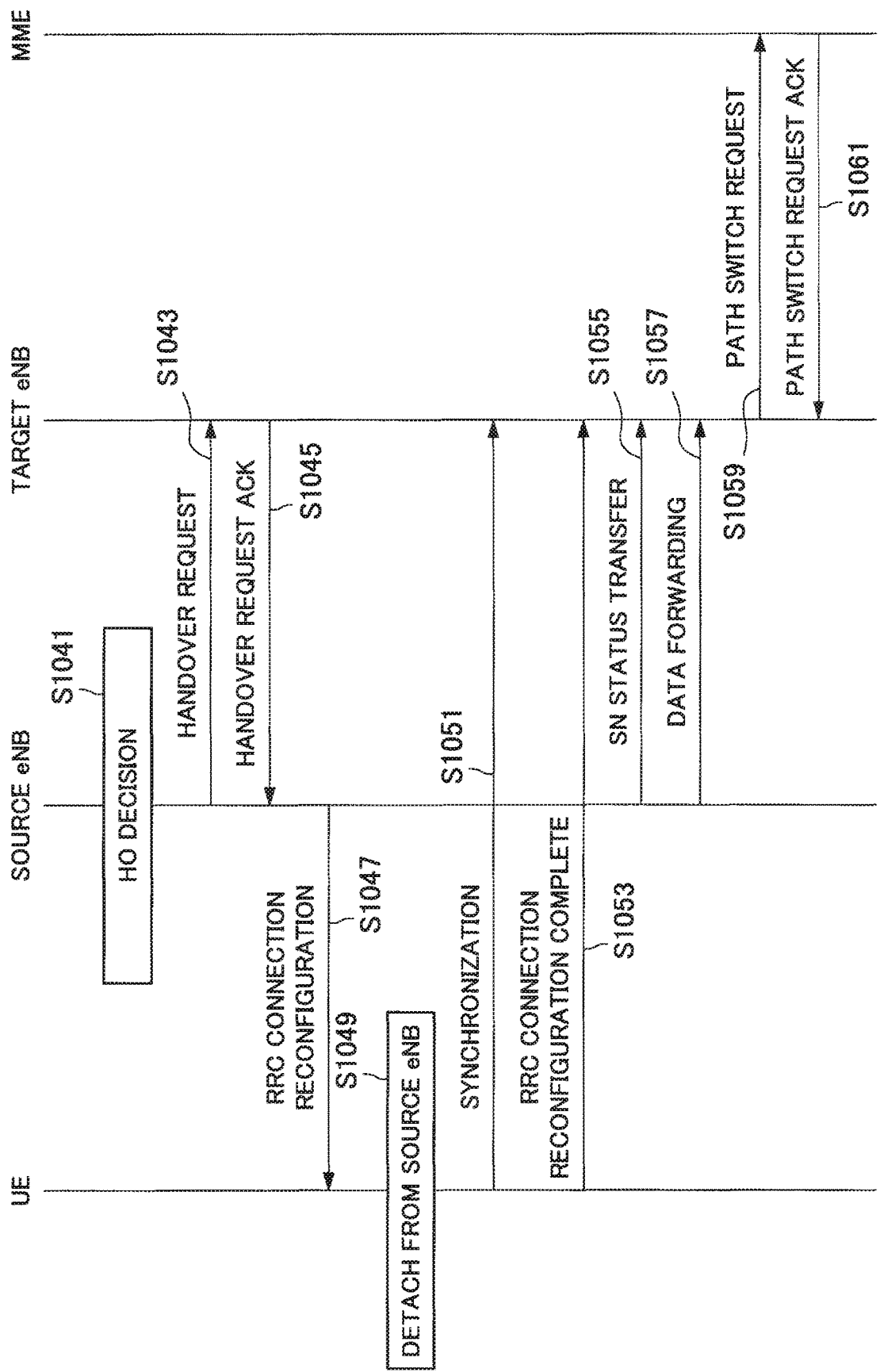
FIG. 8 is a sequence diagram showing an example of a schematic flow of a handover procedure.

FIG. 8 is a sequence diagram showing an example of a schematic flow of the handover procedure.

A source eNB decides handover of a UE from the source eNB to a target eNB (S1041). Then, the source eNB transmits a handover request message to the target eNB (S1043), and receives a handover request ACK message from the target eNB (S1045).

Further, the source eNB transmits an RRC connection reconfiguration message for executing handover to the target eNB to the UE (S1047). Then, the UE performs detachment from the source eNB (S1049). In addition, the UE achieves synchronization with the target eNB (S1051), and transmits an RRC connection reconfiguration complete message to the target eNB (S1053).

In addition, the source eNB transmits an SN status transfer message to the target eNB (S1055), and performs forwarding of data to the target eNB (S1057).

Then, the target eNB transmits a path switch request message to the MME (S1059), and the MME transmits a path switch request ACK message to the target eNB (S1061).

2. SCHEMATIC CONFIGURATION OF A COMMUNICATION SYSTEM

Figure 9:
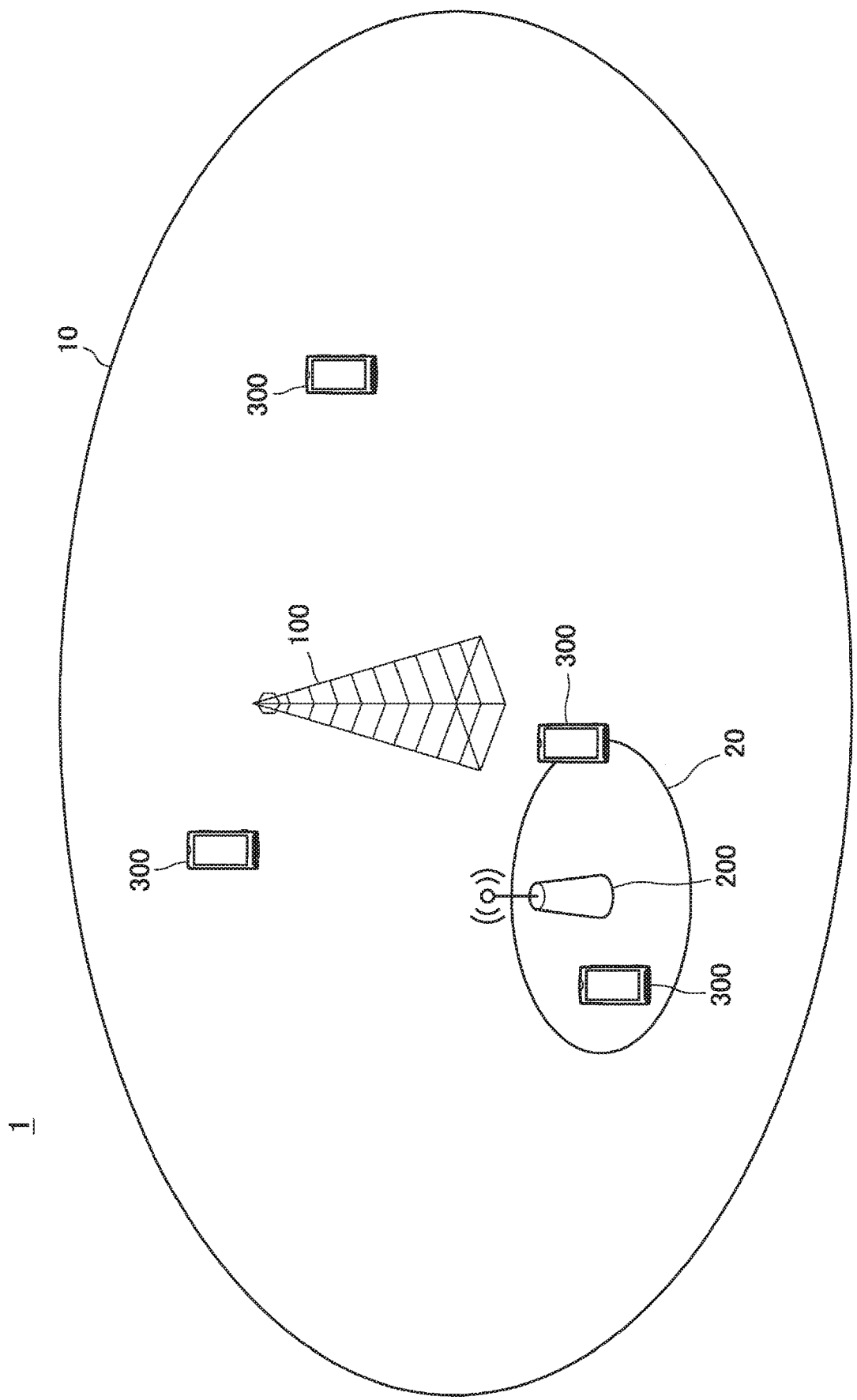
FIG. 9 is an illustrative diagram showing an example of a schematic configuration of a communication system 1 according to an embodiment.

Next, a schematic configuration of a communication system 1 according to an embodiment of the present disclosure will be described with reference to FIGS. 9 and 10. FIG. 9 is an illustrative diagram showing an example of the schematic configuration of the communication system 1 according to the embodiment of the present disclosure. Referring to FIG. 9, the communication system includes 1, a macro base station 100, a small base station 200, and terminal devices 300. The communication system 1 is, for example, a system conforming to LTE, LTE-Advanced, or a communication standard equivalent thereto.

(Macro Base Station 100)

The macro base station 100 is a base station of a macrocell 10 and performs wireless communication with the terminal devices 300 positioned within the macrocell 10. In addition, the macro base station 100 communicates with the small base station 200 through backhaul.

For example, the macro base station 100 performs wireless communication using component carriers (CCs) of the macrocell 10.

(Small Base Station 200)

The small base station 200 is a base station of a small cell 20 overlapping the macrocell 10, and performs wireless communication with the terminal devices 300 positioned within the small cell 20. In addition, for example, the small base station 200 communicates with the macro base station 100 through backhaul. Note that the small cell 20 is a cell smaller than the macrocell 10, and may be called a picocell, a femtocell, or a microcell.

For example, the small base station 200 performs wireless communication using CCs of the small cell 20. The CCs of the small cell 20, for example, are different from the CCs of the macrocell 10.

Note that the small cell 20 is, for example, a cell in which only downlink CCs can be used. Specifically, for example, only downlink bands are allocated to the small cell 20. Thus, the small base station 200 uses downlink CCs, but does not use uplink CCs. That is, the small base station 200 performs downlink wireless communication, but does not perform uplink wireless communication. The downlink bands allocated to the small cell 20 may include a downlink-dedicated band such as operating band 29 stipulated in the 3GPP, as an example. As another example, bands for a wireless LAN (for example, a 2.4 GHz band and/or a 5 GHz band) are used for downlink, and the downlink bands allocated to the small cell 20 may be the bands for the wireless LAN. The downlink CCs may be channels for the wireless LAN (or part of the channels) included in the band for the wireless LAN.

(Terminal Device 300)

A terminal device 300 performs wireless communication with the macro base station 100 when it is positioned within the macrocell 10. In addition, the terminal device 300 performs wireless communication with the small base station 200 when it is positioned within the small cell 20.

The terminal device 300 can support carrier aggregation and perform wireless communication using 2 or more CCs. For example, the terminal device 300 can communicate with the macro base station 100 using 2 or more CCs of the macrocell 10. In addition, the terminal device 300 can communicate with, for example, the small base station 200 using 2 or more CCs of the small cell 20.

Particularly in the embodiment of the present disclosure, the terminal device 300 supports carrier aggregation between base stations. For example, the terminal device 300 can perform wireless communication using CCs of the macrocell 10 and CCs of the small cell 20.

(Arrangement of the Small Cell 20)

Although an example in which one small cell 20 overlaps the macrocell 10 is shown in FIG. 9, two or more small cells 20 may overlap the macrocell 10. A specific example of this subject will be described below with reference to FIG. 10.

Figure 10:
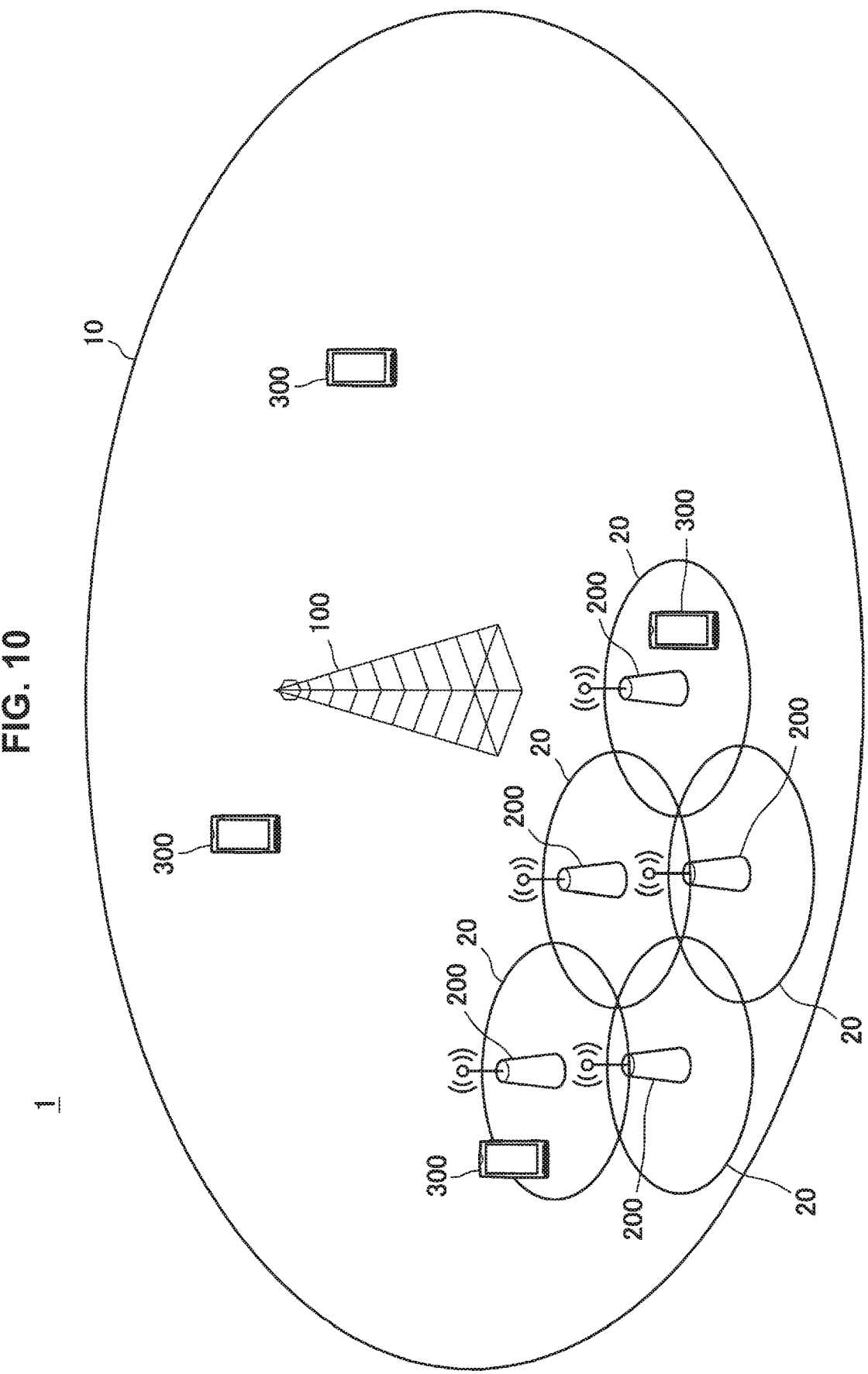
FIG. 10 is an illustrative diagram for describing another example of an arrangement of small cells.

FIG. 10 is an illustrative diagram for describing another example of an arrangement of small cells 20. Referring to FIG. 10, for example, a cluster of the small cells 20 overlapping the macrocell 10 is shown. In this manner, two or more small cells 20 may overlap the macrocell 10, and two or more small cells 20 may form a cluster.

In addition, although the example in which the entire small cell 20 overlaps the macrocell 10 is shown in FIG. 9 (and FIG. 10), a part of the small cell 20 may overlap the macrocell 10.

3. CONFIGURATION OF EACH DEVICE

Next, a configuration of each device according to the embodiment of the present disclosure will be described with reference to FIGS. 11 to 16.

<3.1. Configuration of a Macro Base Station 100>

Figure 11:
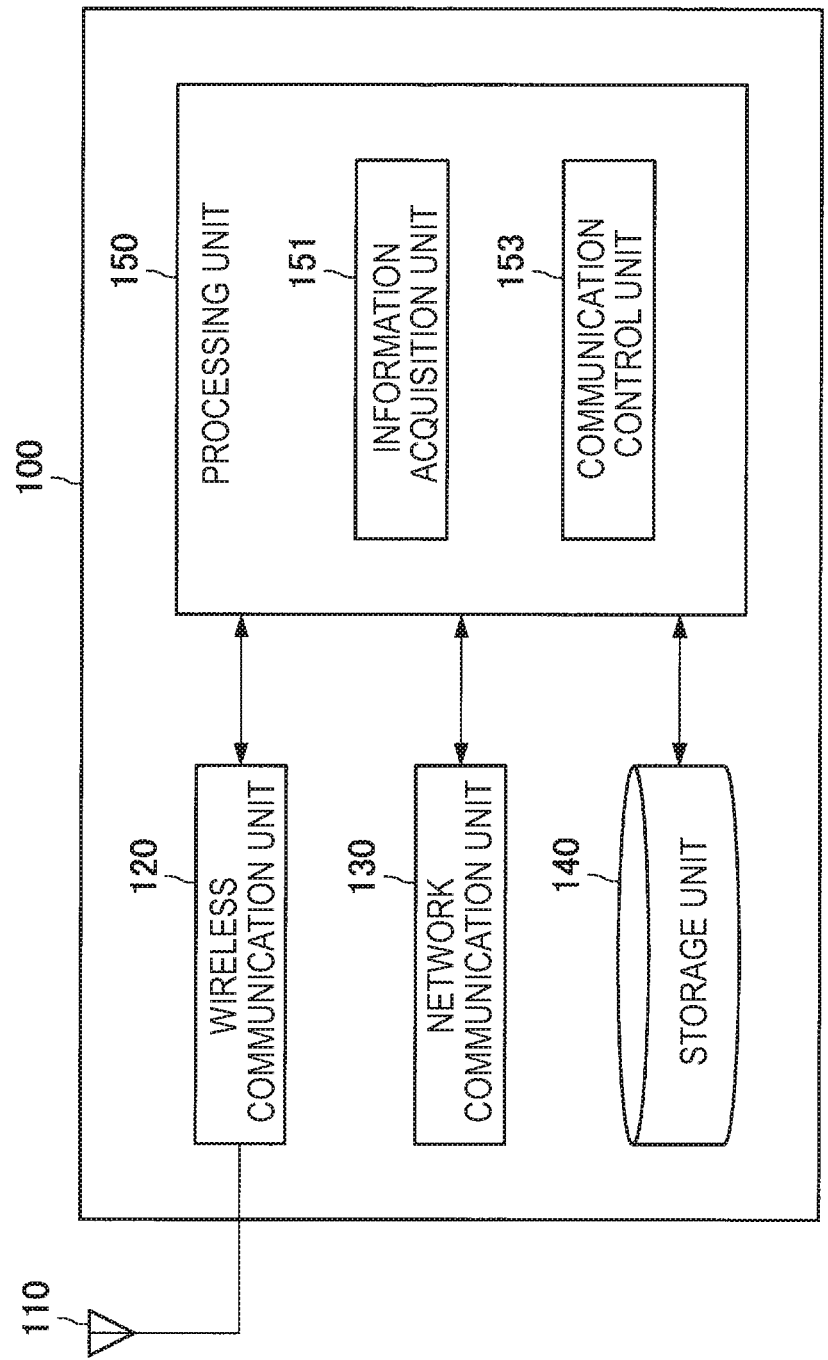
FIG. 11 is a block diagram showing an example of a configuration of a macro base station according to the same embodiment.

First, an example of a configuration of the macro base station 100 according to the embodiment of the present disclosure will be described with reference to FIGS. 11 to 14. FIG. 11 is a block diagram showing the example of the configuration of the macro base station 100 according to the embodiment of the present disclosure. Referring to FIG. 11, the macro base station 100 includes an antenna unit 110, a wireless communication unit 120, a network communication unit 130, a storage unit 140, and a processing unit 150.

(Antenna Unit 110)

The antenna unit 110 radiates signals output by the wireless communication unit 120 to a space as radio waves. In addition, the antenna unit 110 converts radio waves from a space into signals, and outputs the signals to the wireless communication unit 120.

(Wireless Communication Unit 120)

The wireless communication unit 120 transmits and receives signals. For example, the wireless communication unit 120 transmits a downlink signal to the terminal device 300 positioned within the macrocell 10 using downlink CCs of the macrocell 10. In addition, the wireless communication unit 120, for example, receives an uplink signal from the terminal device 300 positioned within the macrocell 10 using uplink CCs of the macrocell 10.

(Network Communication Unit 130)

The network communication unit 130 communicates with another node. For example, the network communication unit 130 communicates with the small base station 200. In addition, the network communication unit 130 communicates with core network nodes (for example, a mobility management entity (MME), a serving gateway (S-GW), and the like).

(Storage Unit 140)

The storage unit 140 temporarily or permanently stores a program and data for operations of the macro base station 100.

(Processing Unit 150)

The processing unit 150 provides various functions of the macro base station 100. The processing unit 150 includes an information acquisition unit 151 and a communication control unit 153. Note that the processing unit 150 can further include constituent elements other than these constituent elements. That is, the processing unit 150 can perform operations other than the operations of these constituent elements as well.

(Information Acquisition Unit 151)

The information acquisition unit 151 acquires a measurement result (measurements) reported by the terminal device 300.

For example, the terminal device 300 uses uplink CCs and downlink CCs of the macrocell 10 as uplink PCCs and downlink PCCs for the terminal device 300, and the information acquisition unit 151 thereby acquires the measurement result reported by the terminal device 300.

Specifically, for example, the terminal device 300 performs measurement with respect to one or more CCs of the macrocell 10 and/or one or more CCs of the small cell 20. Then, the terminal device 300 reports the measurement result with regard to the CCs to the macro base station 100 according to occurrence of an event or periodically. In addition, the measurement result is stored in the storage unit 140. The information acquisition unit 151 acquires the measurement result at any timing thereafter.

The measurement result includes, as an example, Reference Signal Received Power (RSRP) and/or Reference Signal Received Quality (RSRQ).

(Communication Control Unit 153)

(a) Decision of Handover

The communication control unit 153 decides handover in which PCCs are changed based on the measurement result.

The terminal device 300, for example, uses uplink CCs and downlink CCs of the macrocell 10 as uplink PCCs and downlink PCCs for the terminal device 300, and the information acquisition unit 151 acquires a measurement result reported by the terminal device 300 as described above. Then, the communication control unit 153 decides handover in which at least one of the uplink PCCs and the downlink PCCs is changed based on the measurement result.

In the embodiment of the present disclosure, in particular, the communication control unit 153 decides handover in which the downlink CCs of the macrocell 10 are changed to downlink CCs of the small cell 20 (which will be referred to as "special handover") without changing the uplink PCCs (from the uplink CCs of the macrocell 10) when a predetermined condition is satisfied.

Accordingly, for example, it is possible to further reduce consumption of radio resources of the macrocell 10. More specifically, even if the small cell 20 is a cell in which only downlink CCs can be used, downlink PCCs for the terminal device 300 can be downlink CCs of the small cell 20. Thus, consumption of radio resources for downlink of the macrocell 10 can be reduced.

Predetermined Condition

The predetermined condition is satisfied when one or more conditions are satisfied. Note that the predetermined condition may also be satisfied when one or more other conditions are satisfied. At least one condition among the one or more other conditions may be a condition included in the foregoing one or more conditions.

Transmission of a Predetermined Message from the Terminal Device 300

The predetermined condition includes, for example, that a predetermined message be transmitted from the terminal device 300 to the macro base station 100.

The predetermined condition includes, for example, one or more conditions, and is satisfied when the one or more conditions are satisfied. In this case, one of the one or more conditions is that a predetermined message be transmitted from the terminal device 300 to the macro base station 100. The communication control unit 153, for example, decides the special handover when the predetermined message is transmitted from the terminal device 300 to the macro base station 100 and the remaining conditions among the one or more conditions are also satisfied.

Note that, even when the predetermined message is not transmitted from the terminal device 300 to the macro base station 100, the predetermined condition may be satisfied when one or more other conditions are satisfied.

First Example

The predetermined message includes, as a first example, a message indicating that mobility of the terminal device 300 is low.

For example, the predetermined message includes a message including a stationary indication indicating that mobility of the terminal device 300 is low. That is, the predetermined condition includes that the message including the stationary indication be transmitted from the terminal device 300.

Specifically, for example, the terminal device 300 transmits the message including the stationary indication to the macro base station 100 based on an instruction of the user of the terminal device 300 or a setting of the terminal device 300. The communication control unit 153 decides the special handover when the message is transmitted from the terminal device 300 and the remaining conditions are satisfied.

Accordingly, when mobility of the terminal device 300 is low, for example, the downlink PCCs for the terminal device 300 can be changed from the downlink CCs of the macrocell 10 to the downlink CCs of the small cell 20. As a result, for example, consumption of radio resources of the macrocell 10 is reduced, and wireless communication by the terminal device 300 continues without disconnection.

Second Example

As a second example, the predetermined message includes a message indicating that the terminal device 300 prefers low power consumption.

The predetermined message includes, for example, a UE assistance information message including a power preference indication that is set to lower power consumption. That is, the predetermined condition includes that the UE support information message including the power preference indication be transmitted from the terminal device 300.

Specifically, for example, the terminal device 300 transmits the UE assistance information message including the power preference indication that is set to lower power consumption to the macro base station 100 based on an instruction from the user of the terminal device 300 or a setting of the terminal device 300. The communication control unit 153 decides the special handover when the UE assistance information message is transmitted from the terminal device 300 and the remaining conditions are satisfied.

Accordingly, for example, when the terminal device 300 desires low power consumption, the downlink PCCs of the terminal device 300 can be changed from the downlink CCs of the macrocell 10 to the downlink CCs of the small cell 20. As a result, for example, consumption of radio resources of the macrocell 10 is reduced more, and power consumption of the terminal device 300 decreases.

Third Example

As a third example, the macrocell 10 is a cell in which MBMS services are not provided, and the small cell 20 is a cell in which MBMS services are provided. In this case, the predetermined message includes a message indicating that the terminal device 300 prioritizes reception of MBMS over reception of unicast.

For example, the predetermined message includes an MBMS interest indication message including MBMS priority that is true. That is, the predetermined condition includes that the MBMS interest indication message including the MBMS priority be transmitted from the terminal device 300.

Specifically, for example, the terminal device 300 transmits the MBMS interest indication message including the MBMS priority that is true to the macro base station 100 based on an instruction from the user of the terminal device 300 or a setting of the terminal device 300. The communication control unit 153 decides the special handover when the MBMS interest indication message is transmitted from the terminal device 300 and the remaining conditions are satisfied.

Accordingly, when the terminal device 300 desires reception of MBMS in a small cell, for example, the downlink PCCs for the terminal device 300 can be changed from the downlink CCs of the macrocell 10 to the downlink CCs of the small cell 20. As a result, for example, consumption of radio resources of the macrocell 10 can be reduced more, and the terminal device 300 can receive MBMS.

As described above, the predetermined condition includes, for example, that a predetermined condition be transmitted from the terminal device 300 to the macro base station 100. Accordingly, the downlink PCCs for the terminal device 300 can be changed from the downlink CCs of the macrocell 10 to the downlink CCs of the small cell 20 according to, for example, status of the terminal device 300.

Measurement Results

The predetermined condition includes, for example, that a measurement result with regard to the downlink CCs of the small cell 20 be good.

For example, the predetermined condition includes one or more conditions, and is satisfied when the one or more conditions are satisfied. In this case, one of the one or more conditions is that the measurement result with regard to the downlink CCs of the small cell 20 be good. The communication control unit 153 decides the special handover when, for example, the measurement result with regard to the downlink CCs of the small cell 20 is good and the remaining conditions of the one or more conditions are also satisfied.

More specifically, the predetermined condition includes, for example, that the measurement result with regard to the downlink CCs of the small cell 20 be better than a measurement result with regard to the downlink CCs of the macrocell 10. As an example, the predetermined condition includes that the difference obtained by subtracting RSRP (or RSRQ) of the downlink CCs of the macrocell 10 from RSRP (or RSRQ) of the downlink CCs of the small cell 20 exceed a predetermined threshold value.

Accordingly, when the terminal device 300 can obtain fine communication quality in the small cell 20, for example, the downlink PCCs for the terminal device 300 can be changed from the downlink CCs of the macrocell 10 to the downlink CCs of the small cell 20.

(b) Request for Handover to the Small Base Station 200

The communication control unit 153, for example, requests handover from the small base station 200 after decision of handover.

For example, the special handover (that is, handover in which the downlink PCCs for the terminal device 300 are changed from the downlink CCs of the macrocell 10 to the downlink CCs of the small cell 20 without changing uplink PCCs for the terminal device 300 from uplink CCs of the macrocell 10) is decided as described above. Thereafter, the communication control unit 153 requests the special handover from the small base station 200.

Specifically, the communication control unit 153 generates, for example, a handover request message for the special handover, and transmits the handover request message to the small base station 200 via the network communication unit 130.

Accordingly, for example, it is possible to cause the small base station 200 to operate for the special handover.

(c) Transmission of a Message for Executing Handover

The communication control unit 153, for example, controls transmission of a message for executing handover to the terminal device 300.

For example, the special handover (that is, handover in which the downlink PCCs for the terminal device 300 are changed from the downlink CCs of the macrocell 10 to the downlink CCs of the small cell 20 without changing the uplink PCCs for the terminal device 300 from the uplink CCs of the macrocell 10) is decided as described above. In this case, the communication control unit 153, for example, controls transmission of the message for executing the special handover to the terminal device 300.

Specific Example of a Message

Specifically, the message for executing the special handover is, for example, an RRC connection reconfiguration message. For example, the RRC configuration message includes mobility control information having an uplink carrier frequency and a downlink carrier frequency as information elements. In addition, the mobility control information indicates uplink CCs of the macrocell 10 as the uplink carrier frequency, and indicates downlink CCs of the small cell 20 as the downlink carrier frequency. Alternatively, the mobility control information may indicate downlink CCs of the small cell 20 as the downlink carrier frequency, without indicating any CC as the uplink carrier frequency.

Specific Example of an Operation

When the special handover is decided, for example, the macro base station 100 transmits a handover request message for the special handover to the small base station 200 as described above. Thereafter, the small base station 200 generates an RRC configuration message for executing the special handover. Then, the small base station 200 transmits a handover request ACK message including the RRC configuration message to the macro base station 100, and the macro base station 100 receives the handover request ACK message. Further, the communication control unit 153 allocates radio resources (for example, resource blocks) for transmitting the RRC configuration message to the terminal device 300. Thereafter, the RRC configuration message is transmitted from the macro base station 100 to the terminal device 300.

Note that the RRC configuration message may be generated by the macro base station 100 (for example, the communication control unit 153), instead of by the small base station 200. In this case, the macro base station 100 may be provided with information necessary for generating the RRC configuration message from the small base station 200.

As described above, the message for executing the special handover is transmitted. Accordingly, the terminal device 300, for example, can change the downlink PCCs from the CCs of the macrocell 10 to the CCs of the small cell 20, without changing the uplink PCCs from the CCs of the macrocell 10.

(d) Use of CCs

The communication control unit 153 uses CCs of the macrocell 10 for wireless communication with the terminal device 300.

The communication control unit 153, for example, allocates radio resources of CCs of the macrocell 10 for wireless communication with the terminal device 300. Specifically, for example, the communication control unit 153 allocates radio resources of uplink CCs of the macrocell 10 for uplink transmission from the terminal device 300. In addition, for example, the communication control unit 153 allocates radio resources of downlink CCs of the macrocell 10 for downlink transmission to the terminal device 300.

Use of CCs after the Special Handover

For example, the special handover (that is, handover in which the downlink PCCs for the terminal device 300 are changed from the downlink CCs of the macrocell 10 to the downlink CCs of the small cell 20, without changing the uplink PCCs for the terminal device 300 from the uplink CCs of the macrocell 10) is decided as described above. Then, the special handover is executed.

Uplink CCs of the Macrocell 10

The communication control unit 153 uses the uplink CCs of the macrocell 10 as uplink PCCs for the terminal device 300 for wireless communication with the terminal device 300 after execution of the special handover. Note that the terminal device 300 uses the uplink CCs of the macrocell 10 as uplink PCCs for the terminal device 300, and uses the downlink CCs of the small cell 20 for downlink PCCs for the terminal device 300 after execution of the special handover.

Downlink CCs of the Macrocell 10

First Example

The communication control unit 153, for example, does not use the downlink CCs of the macrocell 10 for wireless communication with the terminal device 300 after the execution of the special handover. That is, the downlink CCs of the macrocell 10 that have been used as downlink PCCs of the terminal device 300 are no longer used for wireless communication with the terminal device 300.

For example, after the execution of the special handover, deactivation of the downlink CCs of the macrocell 10 is performed. Then, the macro base station 100 (the communication control unit 153) does not allocate radio resources of the downlink CCs of the macrocell 10 for wireless communication with the terminal device 300. A specific example of this subject will be described below with reference to FIGS. 12 and 13.

Figure 12:
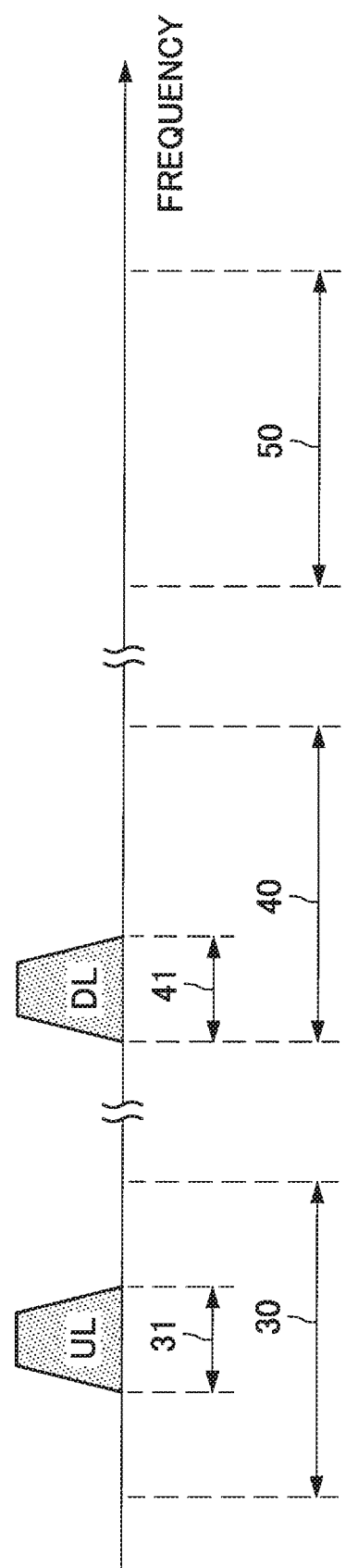
FIG. 12 is an illustrative diagram for describing an example of a use situation of CCs before special handover.

FIG. 12 is an illustrative diagram for describing an example of a use situation of CCs before special handover. Referring to FIG. 12, the terminal device 300 uses, for example, an uplink CC 31 of an uplink band 30 for the macrocell 10 as an uplink PCC before special handover. In addition, the terminal device 300 uses a downlink CC 41 of a downlink band 40 for the macrocell 10 as a downlink PCC. The macro base station 100 (the communication control unit 153) uses the uplink CC 31 and the downlink CC 41 for wireless communication with the terminal device 300.

Figure 13:
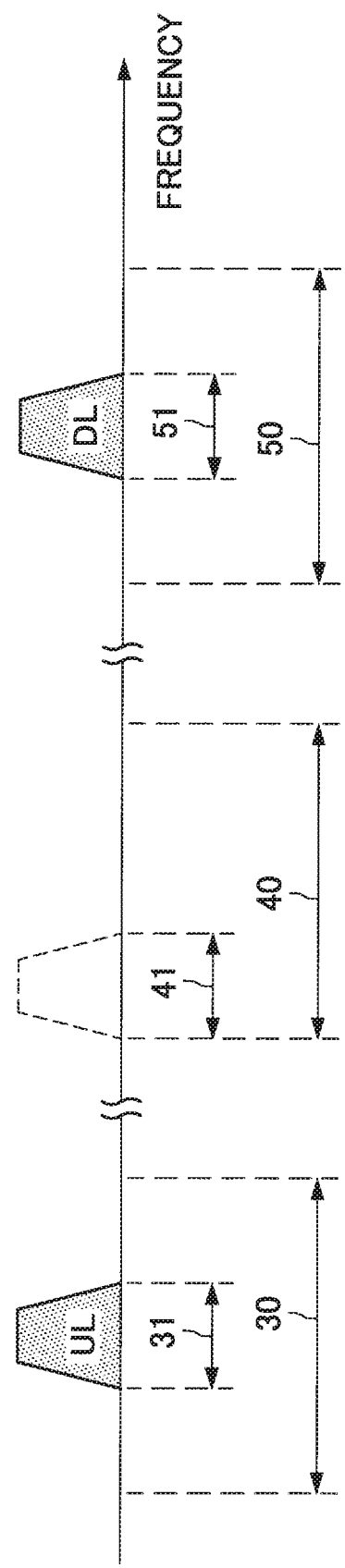
FIG. 13 is an illustrative diagram for describing a first example of a use situation of CCs after special handover.

FIG. 13 is an illustrative diagram for describing a first example of a use situation of CCs after special handover. Referring to FIG. 13, the terminal device 300 uses, for example, a downlink CC 51 of a downlink band 50 for the small cell 20 as a downlink PCC while continuously using the uplink CC 31 as an uplink PCC after special handover. The macro base station 100 (the communication control unit 153) continuously uses the uplink CC 31 as an uplink PCC for the terminal device 300 for wireless communication with the terminal device 300. In addition, the downlink CC 41 that was a downlink PCC before the special handover is no longer used after the special handover.

As described above, the downlink CC of the macrocell 10 is no longer used after the execution of the special handover. Accordingly, for example, consumption of the radio resources of the macrocell 10 can be reduced more.

Note that, as an example, deactivation of the downlink CC of the macrocell 10 is autonomously performed by the terminal device 300 upon receiving a message for the execution of the special handover (for example, an RRC connection reconfiguration message). As another example, the deactivation may be performed by the macro base station 100 (for example, the communication control unit 153) through an MAC control element or an RRC connection reconfiguration message. A new procedure for such deactivation of only the downlink CCs can be prescribed in a standard.

Second Example

The communication control unit 153 may use the downlink CC of the macrocell 10 as a downlink SCC for the terminal device 300 for wireless communication with the terminal device 300 after the execution of the special handover.

After the execution of the special handover, for example, the macro base station 100 (the communication control unit 153) may allocate radio resources of the downlink CC of the macrocell 10 for wireless communication with the terminal device 300. A specific example of this subject will be described below with reference to FIG. 14.

Figure 14:
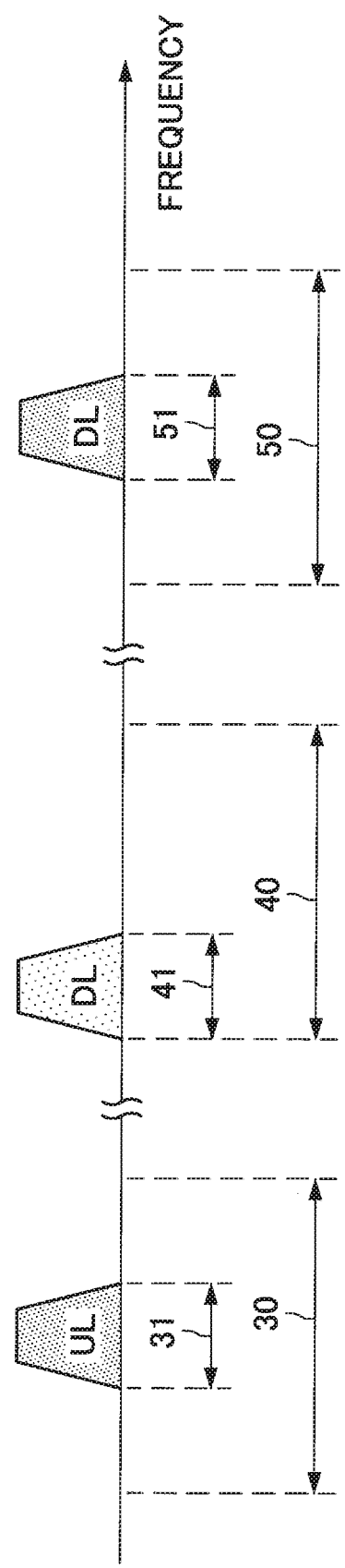
FIG. 14 is an illustrative diagram for describing a second example of a use situation of CCs after special handover.

FIG. 14 is an illustrative diagram for describing a second example of a use situation of CCs after special handover. Referring to FIG. 14, for example, the terminal device 300 uses the downlink CC 51 of the downlink band 50 for the small cell 20 as a downlink PCC while continuously using the uplink CC 31 as an uplink PCC after the special handover. In addition, the terminal device 300 uses the downlink CC 41 which was a downlink PCC before the special handover as a downlink SCC. The macro base station 100 (the communication control unit 153) uses the uplink CC 31 as an uplink PCC for the terminal device 300 for wireless communication with the terminal device 300. In addition, the macro base station 100 (the communication control unit 153) uses the downlink CC 41 as a downlink SCC for the terminal device 300 for wireless communication with the terminal device 300.

As described above, the downlink CC of the macrocell 10 may be used as an SCC after the execution of the special handover. Accordingly, for example, throughput of the terminal device 300 in downlink can improve.

<3.2. Configuration of a Small Base Station 200>

Figure 15:
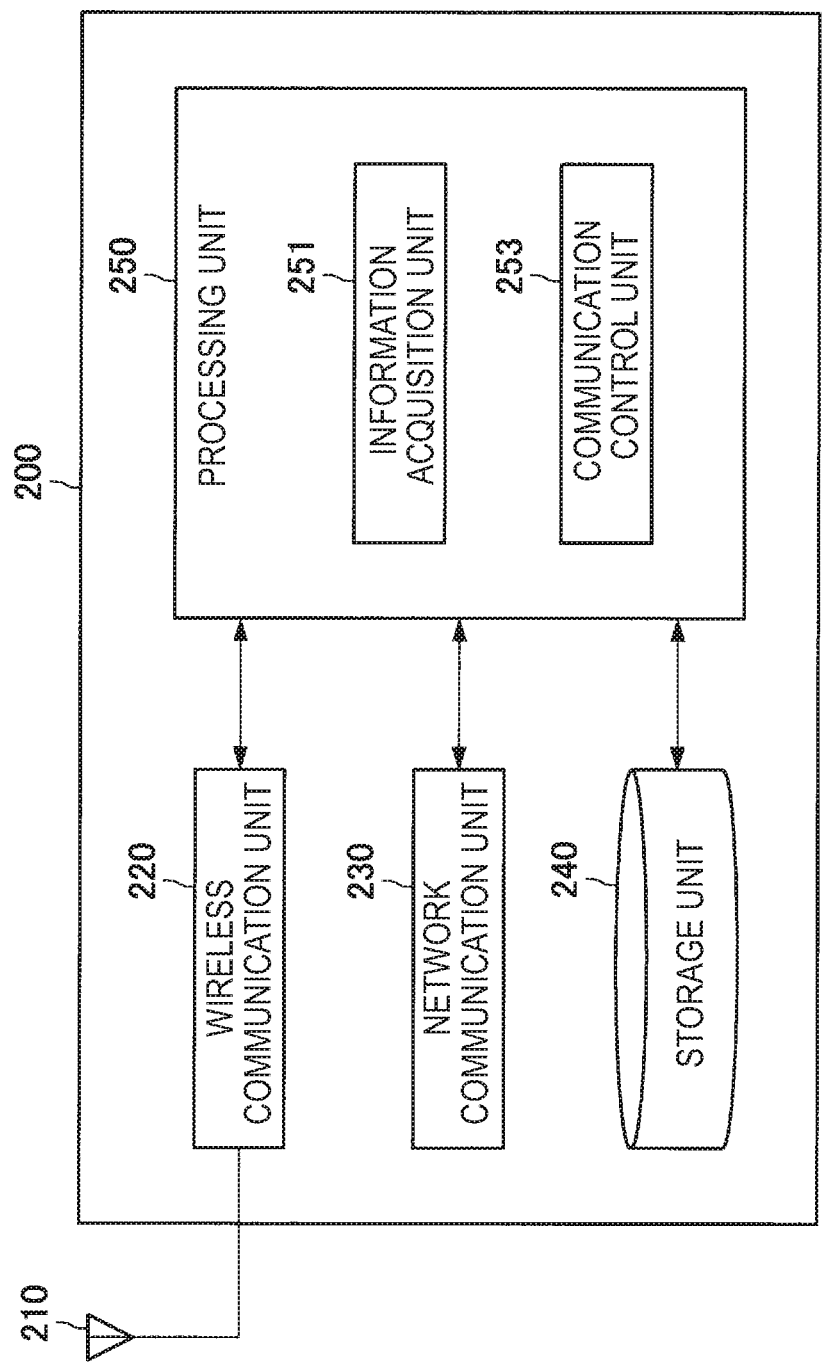
FIG. 15 is a block diagram showing an example of a configuration of a small base station according to the same embodiment.

Next, an example of a configuration of the small base station 200 according to the embodiment of the present disclosure will be described with reference to FIG. 15. FIG. 15 is a block diagram showing an example of a configuration of the small base station 200 according to the embodiment of the present disclosure. Referring to FIG. 15, the small base station 200 is provided with an antenna unit 210, a wireless communication unit 220, a network communication unit 230, a storage unit 240, and a processing unit 250.

(Antenna Unit 210)

The antenna unit 210 radiates signals output from the wireless communication unit 220 to a space as radio waves.

(Wireless Communication Unit 220)

The wireless communication unit 220 transmits signals. For example, the wireless communication unit 220 transmits a downlink signal to the terminal device 300 that is positioned within the small cell 20 using a downlink CC of the small cell 20.

(Network Communication Unit 230)

The network communication unit 230 communicates with another node. For example, the network communication unit 230 communicates with the macro base station 100. In addition, the network communication unit 130 communicates with core network nodes (for example, an MME, S-GW, and the like).

(Storage Unit 240)

The storage unit 240 temporarily or permanently stores a program and data for operations of the small base station 200.

(Processing Unit 250)

The processing unit 250 provides various functions of the small base station 200. The processing unit 250 includes an information acquisition unit 251 and a communication control unit 253. Note that the processing unit 250 can further include constituent elements other than these constituent elements. That is, the processing unit 250 can perform operations other than the operations of these constituent elements as well.

(Information Acquisition Unit 251)

The information acquisition unit 251 acquires a handover request message transmitted by another base station.

For example, another base station decides handover in which downlink PCCs for the terminal device 300 are changed to downlink CCs of the small cell 20. Then, the other base station transmits a handover request message for the handover to the small base station 200. Then, the information acquisition unit 251 acquires the handover request message.

For example, execution of the special handover (that is, handover in which downlink PCCs for the terminal device 300 are changed from downlink CCs of the macrocell 10 to downlink CCs of the small cell 20, without changing uplink PCCs for the terminal device 300 from uplink CCs of the macrocell 10) is decided by the macro base station 100. Then, the information acquisition unit 251 acquires the handover request message for the execution of the special handover.

(Communication Control Unit 253)

(a) Control of Handover

Admission Control

The communication control unit 253 performs admission control with respect to the small cell 20.

Specifically, when the information acquisition unit 251 acquires a handover request message transmitted from another base station, for example, the communication control unit 253 performs admission control based on the handover request message.

Generation of a Message for Execution of Handover

The communication control unit 253 generates a message for execution of handover, which is the message to be transmitted to the terminal device 300. The message is, for example, an RRC connection reconfiguration message.

For example, execution of the special handover (that is, handover in which downlink PCCs for the terminal device 300 are changed from downlink CCs of the macrocell 10 to downlink CCs of the small cell 20, without changing uplink PCCs for the terminal device 300 from uplink CCs of the macrocell 10) is decided. In this case, the communication control unit 253 generates, for example, a message for execution of the special handover which is the message to be transmitted to the terminal device 300. A specific example of the message is as described with respect to the macro base station 100 (the communication control unit 153).

The communication control unit 253, for example, transmits a handover request ACK message including the message for the execution of the special handover (for example, an RRC connection reconfiguration message) to the macro base station 100 via the network communication unit 230.

Note that the communication control unit 253 may provide information necessary for generating the message to the macro base station 100, instead of generating the message for the execution of the special handover (for example, the RRC connection reconfiguration message).

Path Switch Request

The communication control unit 253, for example, requests a switch of a path from an MME. Specifically, for example, the communication control unit 253 transmits a path switch request message to the MME via the network communication unit 230 at the time of handover.

(b) Use of CCs

The communication control unit 253 uses CCs of the small cell 20 for wireless communication with the terminal device 300.

The small cell 20, for example, is a cell in which only downlink CCs can be used, and the small base station 200 uses downlink CCs but does not use uplink CCs as described above. In this case, the communication control unit 153 uses downlink CCs of the small cell 20 for downlink transmission to the terminal device 300. Specifically, for example, the communication control unit 153 allocates radio resources of the downlink CCs of the small cell 20 for downlink transmission to the terminal device 300.

Use of CCs after Special Handover

For example, execution of the special handover (that is, handover in which downlink PCCs for the terminal device 300 are changed from downlink CCs of the macrocell 10 to downlink CCs of the small cell 20, without changing uplink PCCs for the terminal device 300 from uplink CCs of the macrocell 10) is decided. Then, the special handover is executed.

The communication control unit 253 uses the downlink CCs of the small cell 20 as downlink PCCs for the terminal device 300 for wireless communication with the terminal device 300 after the execution of the special handover.

<3.3. Configuration of a Terminal Device 300>

Figure 16:
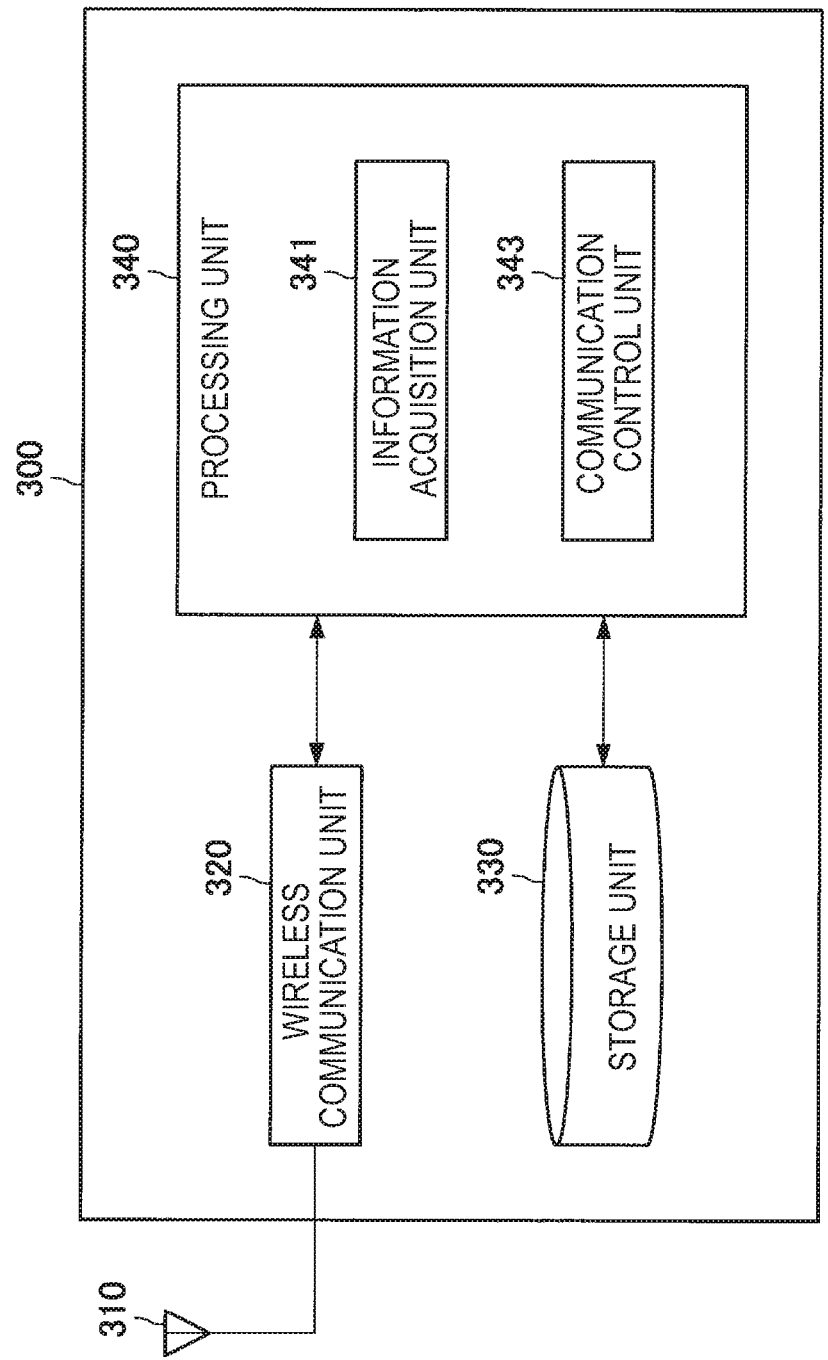
FIG. 16 is a block diagram showing an example of a configuration of a terminal device according to the same embodiment.

Next, an example of a configuration of the terminal device 300 according to the embodiment of the present disclosure will be described with reference to FIG. 16. FIG. 16 is a block diagram showing the example of the configuration of the terminal device 300 according to the embodiment of the present disclosure. Referring to FIG. 16, the terminal device 300 is provided with an antenna unit 310, a wireless communication unit 320, a storage unit 330, and a processing unit 340.

(Antenna Unit 310)

The antenna unit 310 radiates signals output from the wireless communication unit 320 to a space as radio waves. In addition, the antenna unit 310 converts radio waves from a space into signals, and outputs the signals to the wireless communication unit 320.

(Wireless Communication Unit 320)

The wireless communication unit 320 transmits and receives signals.

For example, the wireless communication unit 320 receives a downlink signal transmitted from the macro base station 100 using downlink CCs of the macrocell 10. In addition, for example, the wireless communication unit 320 transmits an uplink signal to the macro base station 100 using uplink CCs of the macrocell 10.

The wireless communication unit 320, for example, receives a downlink signal transmitted from the small base station 200 using downlink CCs of the small cell 20.

(Storage Unit 330)

The storage unit 330 temporarily or permanently stores a program and data for operations of the terminal device 300.

(Processing Unit 340)

The processing unit 340 provides various functions of the terminal device 300. The processing unit 340 includes an information acquisition unit 341 and a communication control unit 343. Note that the processing unit 340 can further include constituent elements other than these constituent elements. That is, the processing unit 340 can perform operations other than the operations of these constituent elements as well.

(Information Acquisition Unit 341)

The information acquisition unit 341 acquires a message for execution of handover, which is the message to be transmitted to the terminal device 300 from a base station.

For example, the macro base station 100 decides execution of the special handover (that is, handover in which downlink PCCs for the terminal device 300 are changed from downlink CCs of the macrocell 10 to downlink CCs of the small cell 20, without changing uplink PCCs for the terminal device 300 from uplink CCs of the macrocell 10) as described above. Then, the macro base station 100 transmits a message for the execution of the special handover to the terminal device 300, and the information acquisition unit 341 acquires the message.

(Communication Control Unit 343)

(a) Transmission of a Message to a Base Station

First Example

The communication control unit 343 generates, for example, a message indicating whether mobility of the terminal device 300 is low, and controls transmission of the message to a base station. The base station is, for example, the macro base station 100. Note that the base station may be the small base station 200.

Specific Example of the Message

The message includes, for example, a stationary indication. In addition, the stationary indication indicates, for example, whether or not mobility of the terminal device 300 is low.

For example, the message including the stationary indication indicating that mobility of the terminal device 300 is low is transmitted to a base station from the terminal device 300 under control of the communication control unit 343.

Specific Example of an Operation

The communication control unit 343 generates, for example, the message including the stationary indication based on an instruction of the user of the terminal device 300 or a setting of the terminal device 300. In addition, the communication control unit 343 maps a signal of the message to radio resources allocated to the terminal device 300 among radio resources of uplink CCs. Accordingly, the message is transmitted to the base station.

Thereby, for example, the base station can recognize whether mobility of the terminal device 300 is low.

Second Example

The communication control unit 343 generates, for example, a message indicating whether the terminal device 300 prefers low power consumption, and controls transmission of the message to a base station. The base station is, for example, the macro base station 100. Note that the base station may be the small base station 200.

Specific Example of the Message

The message is, for example, a UE assistance information message including a power preference indication. The power preference indication indicates that the terminal device 300 prefers low power consumption when low power consumption is set.

The UE assistance information message including the power preference indication that is set to low power consumption is, for example, transmitted to a base station from the terminal device 300 under control of the communication control unit 343.

Specific Example of an Operation

The communication control unit 343 generates, for example, the UE assistance information message based on an instruction of the user of the terminal device 300 or a setting of the terminal device 300. Then, the communication control unit 343 maps a signal of the UE assistance information message to radio resources allocated to the terminal device 300 among radio resources of uplink CCs. Accordingly, the UE assistance information message is transmitted to a base station.

Third Example

The communication control unit 343 generates, for example, a message indicating whether the terminal device 300 prioritizes reception of MBMs over reception of unicast, and controls transmission of the message to a base station. The base station is, for example, the macro base station 100. Note that the base station may be the small base station 200.

Specific Example of the Message

The message is, for example, an MBMS interest indication message including MBMS priority. The MBMS priority indicates, when it is true, that the terminal device 300 prioritizes reception of MBMS over reception of unicast.

For example, the MBMS interest indication message including the MBMS priority that is true is transmitted to a base station from the terminal device 300 under control of the communication control unit 343.

Specific Example of an Operation

The communication control unit 343 generates, for example, the MBMS interest indication message based on an instruction of the user of the terminal device 300 or a setting of the terminal device 300. Then, the communication control unit 343 maps a signal of the MBMS interest indication message to radio resources allocated to the terminal device 300 among radio resources of uplink CCs. Accordingly, the MBMS interest indication message is transmitted to a base station.

(b) Use of CCs

Use of PCCs

The communication control unit 343 uses, for example, CCs as PCCs for the terminal device 300.

Uplink PCCs

The communication control unit 343 uses, for example, uplink CCs as uplink PCCs for the terminal device 300.

Specifically, for example, the communication control unit 343 maps a signal of uplink control information (UCI) to radio resources of a physical uplink control channel (PUCCH) among radio resources of the uplink CCs. Accordingly, the uplink control information is transmitted on the PUCCH of the uplink PCCs. The uplink control information includes, for example, channel state information (CSI), a scheduling request and hybrid automatic repeat request (HARD) ACK, and the like.

In addition, the communication control unit 343, for example, maps a signal of data to radio resources of a physical uplink shared channel (PUSCH) among radio resources of the uplink CCs. Accordingly, the signal of the data is transmitted on the PUSCH of the uplink PCCs.

Downlink PCCs

The communication control unit 343, for example, uses downlink CCs as downlink PCCs for the terminal device 300.

Specifically, for example, a non-access stratum (NAS) message destined for the terminal device 300 is transmitted using downlink CCs that are downlink PCCs for the terminal device 300. More specifically, the NAS message is transmitted on a physical downlink shared channel (PDSCH) of the downlink CCs. Then, the communication control unit 343 acquires the NAS message transmitted on the PDSCH of the downlink CCs (that is, the downlink PCCs).

In addition, for example, the communication control unit 343 acquires data destined for the terminal device 300 transmitted on the PDSCH of the downlink CCs (that is, the downlink PCCs).

Use of SCCs

The communication control unit 343, for example, uses CCs as SCCs for the terminal device 300.

Uplink SCCs

The communication control unit 343, for example, uses uplink CCs as uplink SCCs for the terminal device 300.

Specifically, for example, the communication control unit 343 maps a signal of data to radio resources of a PUSCH among radio resources of the uplink CCs. Accordingly, the signal of the data is transmitted on the PUSCH of the uplink SCCs.

Downlink SCCs

The communication control unit 343, for example, uses downlink CCs as downlink SCCs for the terminal device 300.

Specifically, for example, the communication control unit 343 acquires data destined for the terminal device 300 transmitted on the PDSCH of the downlink CCs (that is, the downlink SCCs).

Use of PCCs Before and after Execution of the Special Handover

The communication control unit 343, for example, uses uplink CCs and downlink CCs of the macrocell 10 as uplink PCCs and downlink PCCs for the terminal device 300.

Thereafter, the macro base station 100 decides, for example, execution of the special handover (handover in which downlink PCCs for the terminal device 300 are changed from downlink CCs of the macrocell 10 to downlink CCs of the small cell 20 without changing uplink PCCs for the terminal device 300 from uplink CCs of the macrocell 10) as described above. Then, the macro base station 100 transmits a message for the execution of the special handover (for example, an RRC connection reconfiguration message) to the terminal device 300, and the information acquisition unit 341 acquires the message.

Then, the communication control unit 343 uses the uplink CCs of the macrocell 10 as the uplink PCCs after the execution of the special handover, and uses the downlink CCs of the small cell 20 as the downlink PCCs.

Specifically, for example, the terminal device 300 uses the uplink CCs (uplink PCCs) of the macrocell 10 to transmit a response message to the message for the execution of the special handover to the macro base station 100 under control of the communication control unit 343. The response message is, for example, an RRC connection reconfiguration complete message. Then, after the transmission of the response message, the communication control unit 343 uses the downlink CCs of the small cell 20 as downlink PCCs while continuously using the uplink CCs of the macrocell 10 as uplink PCCs.

Accordingly, for example, consumption of radio resources of the macrocell 10 can be reduced more. More specifically, for example, even if the small cell 20 is a cell in which only downlink CCs can be used, downlink PCCs for the terminal device 300 can be the downlink CCs of the small cell 20. Thus, consumption of radio resources for downlink of the macrocell 10 can be reduced.

Use of Downlink CCs of the Macrocell 10 after Special Handover

First Example

The communication control unit 343, for example, does not use the downlink CCs of the macrocell 10 for wireless communication with the macro base station 100 after the execution of the special handover (that is, downlink CCs that were used as downlink PCCs before the execution of the special handover).

After the execution of the special handover, for example, deactivation of the downlink CCs of the macrocell 10 is performed. As an example, the deactivation is autonomously performed by the terminal device 300 (for example, the communication control unit 343) according to reception of a message for the execution of the special handover (for example, an RRC connection reconfiguration message). As another example, the deactivation may be performed by the macro base station 100 through an MAC control element or an RRC connection reconfiguration message. A new procedure for such deactivation of only the downlink CCs can be prescribed in a standard.

Accordingly, for example, consumption of radio resources of the macrocell 10 can be reduced more.

Second Example

The communication control unit 343 may use the downlink CCs of the macrocell 10 as downlink SCCs for the terminal device 300 for wireless communication with the macro base station 100 after the execution of the special handover.

Even after the execution of the special handover, for example, the communication control unit 343 may acquire data destined for the terminal device 300 transmitted on the PDSCH of the downlink CCs (that is, downlink SCCs).

Accordingly, for example, throughput of the terminal device 300 in downlink can improve.

4. PROCESS FLOW

Figure 17:
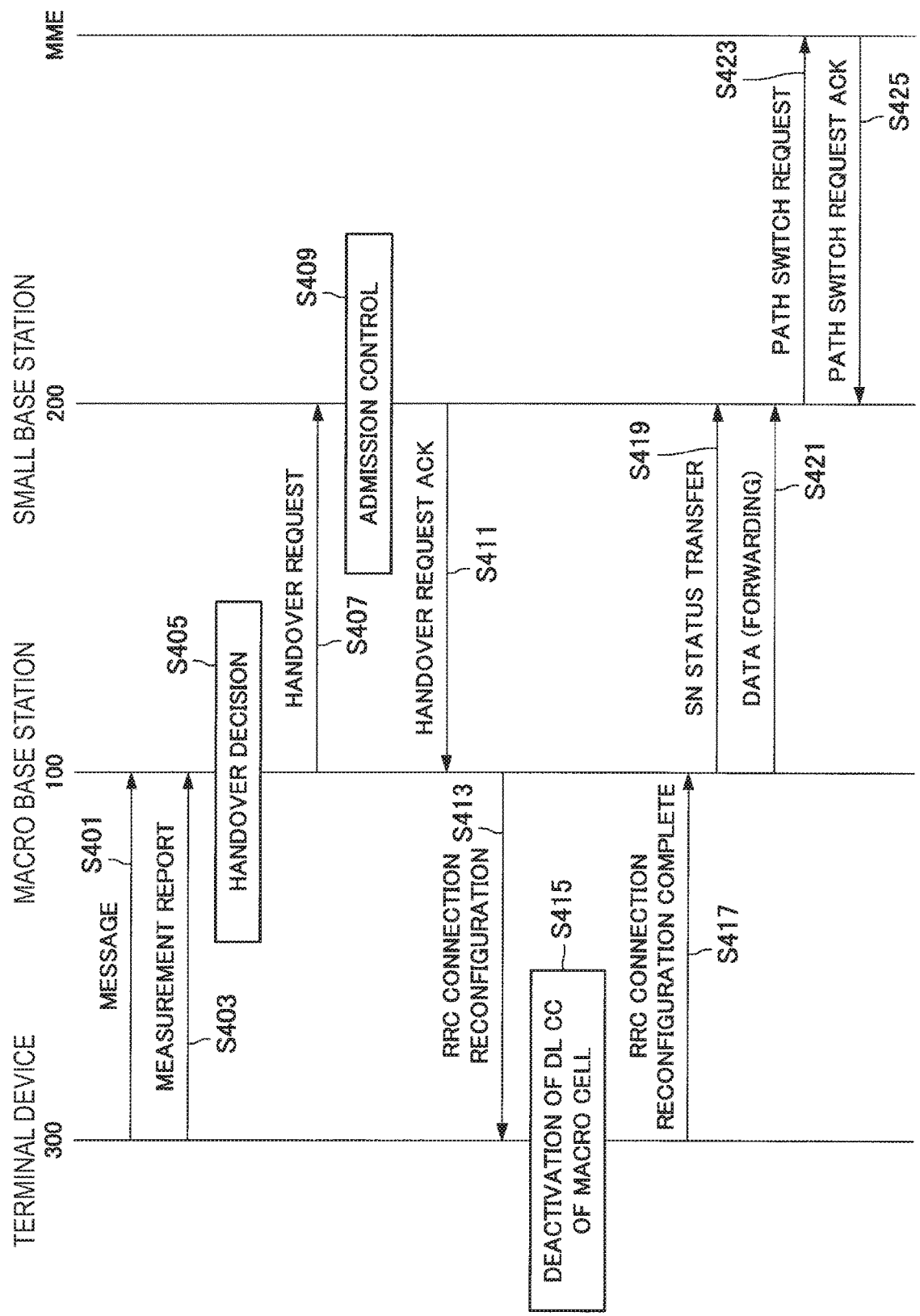
FIG. 17 is a sequence diagram showing an example of a schematic flow of a process according to the same embodiment.

Next, an example of a process according to the embodiment of the present disclosure will be described with reference to FIG. 17. FIG. 17 is a sequence diagram showing the example of a schematic flow of the process according to the embodiment of the present disclosure. Note that, at a starting point of the process, the terminal device 300 is using the uplink CCs and the downlink CCs of the macrocell 10 as uplink PCCs and downlink PCCs for the terminal device 300.

The terminal device 300, for example, transmits a message to the macro base station 100 at a given timing (S401). As a first example, the message is a message indicating that mobility of the terminal device 300 is low. The message includes a message indicating that the terminal device 300 prefers low power consumption (for example, a UE assistance information message). As a third example, the message is a message indicating that the terminal device 300 prioritizes reception of MBMS over reception of unicast (for example, an MBMS interest indication message).

In addition, the terminal device 300 performs measurement reporting (S403). That is, the terminal device 300 reports a measurement result to the macro base station 100.

Then, the macro base station 100 decides handover based on the measurement result reported by the terminal device 300 (S405). In this example, the handover is handover in which downlink PCCs for the terminal device 300 are changed from the downlink CCs of the macrocell 10 into the downlink CCs of the small cell 20, without changing uplink PCCs for the terminal device 300 (that is, special handover).

Thereafter, the macro base station 100 transmits a handover request message for execution of the special handover to the small base station 200 (S407). Then, the small base station 200 performs admission control with respect to the small cell 20 (S409). Then, the small base station 200 transmits a handover request ACK message to the macro base station 100 (S411). The handover request ACK message includes an RRC connection reconfiguration message for execution of the special handover.

In addition, the macro base station 100 transmits the RRC connection reconfiguration message to the terminal device 300 for execution of the special handover using the downlink CCs of the macrocell 10 (that is, downlink PCCs) (S413).

Then, the terminal device 300 performs deactivation of the downlink CCs of the macrocell 10 (S415). Note that, since uplink CCs of the macrocell 10 are continuously used as uplink PCCs, detachment from the macro base station 100 is not performed.

In addition, the terminal device 300 transmits an RRC connection reconfiguration complete message in response to the RRC connection reconfiguration message to the macro base station 100 using the uplink CCs (that is, the uplink PCCs) of the macrocell 10 (S515). Note that the terminal device 300 already has synchronization with the downlink CCs of the small cell 20 (that is, new downlink PCCs after execution of the special handover) through measurement for the downlink CCs of the small cell 20. In addition, since the uplink PCCs are not changed, the terminal device 300 already has synchronization with the uplink PCCs as well.

The macro base station 100 transmits an SN status transfer message to the small base station 200 (S417). In addition, the macro base station 100 forwards data to the small base station 200 (S419).

In addition, the small base station 200 transmits a path switch request message to an MME (S421), and the MMS transmits a path switch request ACK message to the small base station 200 (S423).

5. MODIFIED EXAMPLE

Next, a modified example of the embodiment of the present disclosure will be described with reference to FIG. 18.

In the example of the embodiment of the present disclosure described above, the macro base station 100 transmits a message for execution of the special handover to the terminal device 300. On the other hand, in the modified example of the embodiment of the present disclosure, the small base station 200 transmits a message for execution of the special handover to the terminal device 300.

(Small Base Station 200: Communication Control Unit 253)

(a) Control of Handover

Generation of a Message for Execution of Handover

In the modified example of the embodiment of the present disclosure, for example, a handover request ACK message is transmitted from the small base station 200 to the macro base station 100. However, the handover request ACK message does not include, for example, a message for execution of the special handover (for example, an RRC connection reconfiguration message).

Transmission of a Message for Execution of Handover

In the modified example of the embodiment of the present disclosure, in particular, the communication control unit 253 controls transmission of a message for execution of the special handover to the terminal device 300.

Specific Example of the Message

Specifically, for example, the message for execution of the special handover is an RRC connection reconfiguration message. The RRC configuration message includes, for example, mobility control information having an uplink carrier frequency and a downlink carrier frequency as an information element. In addition, the mobility control information indicates uplink CCs of the macrocell 10 as the uplink carrier frequency, and indicates downlink CCs of the small cell 20 as the downlink carrier frequency. Alternatively, the mobility control information may indicate downlink CCs of the small cell 20 as the downlink carrier frequency, without indicating any CC as the uplink carrier frequency.

CCs Used in Transmission and a Transmission Timing

The communication control unit 253 controls, for example, transmission of the message for execution of the special handover to the terminal device 300 such that the message is transmitted to the terminal device 300 within a predetermined period using downlink CCs of the small cell 20 (that is, future downlink PCCs).

The predetermined period is, for example, a radio frame having a predetermined system frame number (SFN). Alternatively, the predetermined period may be a subframe having a predetermined subframe number within a radio frame having a predetermined SFN.

The predetermined period is, for example, decided in advance by a network (for example, the macro base station 100, the small base station 200, or the like) and the terminal device 300 is notified of the period. As an example, the macro base station 100 notifies the terminal device 300 of the predetermined period in system information or through individual signaling. Note that the predetermined period may be a fixed period.

Accordingly, for example, the terminal device 300 can acquire the message without performing a reception process with respect to the downlink CCs of the small cell 20 that can serve as future downlink PCCs (for example, checking of a PDCCH, or the like) at all times. In other words, it is possible to acquire the message transmitted from the small base station 200 through a reception process within a limited period. That is, a burden of reception of the message on the terminal device 300 can be reduced.

Specific Example of an Operation

The communication control unit 253, for example, allocates radio resources (for example, resource blocks) for transmission of the RRC configuration message to the terminal device 300. For example, the radio resources within the predetermined period among the radio resources of the downlink CCs of the small cell 10 are allocated for transmission of the RRC configuration message. Thereafter, the RRC configuration message is transmitted from the small base station 200 to the terminal device 300 within the predetermined period.

(Macro Base Station 100: Communication Control Unit 153)

(c) Transmission of a Message for Execution of Handover

In the modified example of the embodiment of the present disclosure, the macro base station 100 does not transmit the message for execution of the special handover to the terminal device 300. That is, the communication control unit 153 does not control transmission of the message for execution of the special handover to the terminal device 300.

Note that, for example, the communication control unit 153 notifies the terminal device 300 of the predetermined period within which the message for execution of the special handover is transmitted from the small base station 200. For example, the communication control unit 153 notifies the terminal device 300 of the predetermined period in system information or through individual signaling.

In addition, the communication control unit 153 may notify the terminal device 300 of one or more small cells 20 from which the message for execution of the special handover is likely to be transmitted (for example, one or more small cells 20 to which only downlink bands are allocated). As an example, the communication control unit 153 may notify the terminal device 300 of the one or more small cells 20 out of system information (for example, SIB15). As another example, the communication control unit 153 may notify the terminal device 300 of the one or more small cells 20 through individual signaling (for example, an RRC connection reconfiguration message for a setting of measurement reporting). Accordingly, for example, the terminal device 300 can acquire the message transmitted from the small base station 200 (that is, the message for execution of the special handover) through a reception process with respect to downlink CCs of the limited small cells 20. That is, a burden of reception of the message on the terminal device 300 is reduced.

(Terminal Device 300: Information Acquisition Unit 341)

The information acquisition unit 341 acquires the message that is a message for execution of handover and transmitted from a base station to the terminal device 300.

In the modified example of the embodiment of the present disclosure, in particular, the small base station 200 transmits the message for execution of the special handover to the terminal device 300. Then, the information acquisition unit 341 acquires the message.

Acquisition Timing

The message for execution of the special handover is, for example, transmitted within the predetermined period using downlink CCs of the small cell 20 (that is, new downlink PCCs after execution of the special handover).

The information acquisition unit 341, for example, checks whether information destined for the terminal device 300 is transmitted from scheduling information transmitted on PDCCHs of one or more downlink CCs of one or more small cells 20 through the predetermined period. Then, the information acquisition unit 341 acquires, for example, the information destined for the terminal device 300 (that is, the message for execution of the special handover).

Target CCs

As described above, the macro base station 100 may notify the terminal device 300 of one or more small cells 20 from which the message for execution of the special handover is likely to be transmitted (for example, one or more small cells 20 to which only downlink bands are allocated). Then, the information acquisition unit 341 may check whether information destined for the terminal device 300 is transmitted from scheduling information transmitted on PDCCHs of one or more downlink CCs of the notified one or more small cells 20. Then, the information acquisition unit 341 may acquire the information destined for the terminal device 300 (that is, the message for execution of the special handover).

Alternatively, the terminal device 300 may autonomously check whether information destined for the terminal device 300 is transmitted from scheduling information transmitted on PDCCHs of downlink CCs of a small cell 20 that are likely to be new downlink PCCs. As an example, the downlink CCs may be downlink CCs of which a measurement result has been reported.

Condition of an Operation

The information acquisition unit 341 attempts acquisition of the message transmitted using the downlink CCs of the small cell 20 only when, for example, the terminal device 300 transmits a predetermined message to the macro base station 100. The predetermined message includes, for example, a message indicating that mobility of the terminal device 300 is low, a message indicating that the terminal device 300 prefers low power consumption, and/or a message indicating that the terminal device 300 prioritizes reception of MBMS over reception of unicast.

(Process Flow)

Next, an example of a process according to the modified example of the embodiment of the present disclosure will be described with reference to FIG. 18. FIG. 18 is a sequence diagram showing the example of a schematic flow of the process according to the modified example of the embodiment of the present disclosure. At a starting point of the process, the terminal device 300 is using uplink CCs and downlink CCs of the macrocell 10 as uplink PCCs and downlink PCCs for the terminal device 300.

Figure 18:
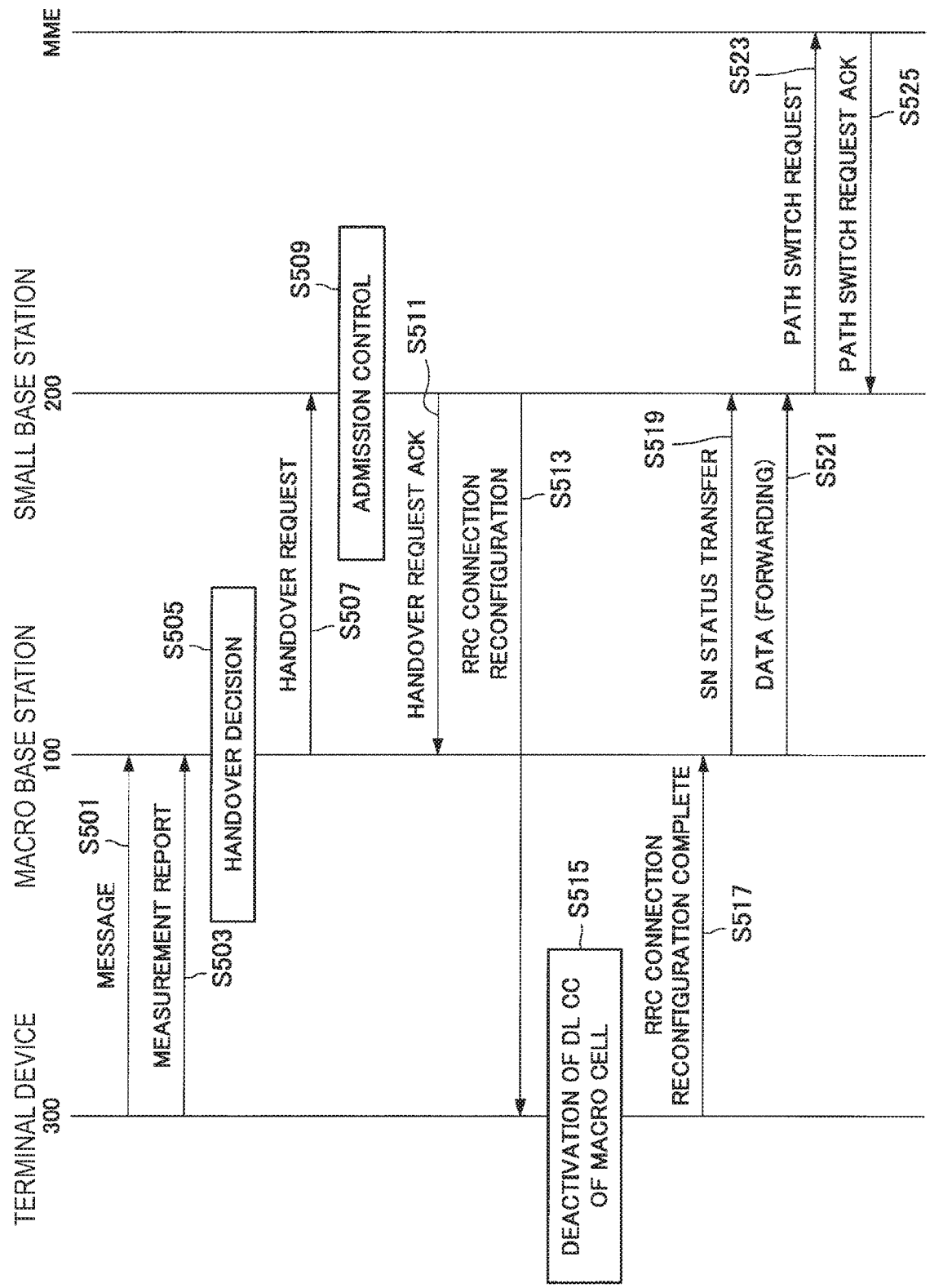
FIG. 18 is a sequence diagram showing an example of a schematic flow of a process according to a modified example of the same embodiment.

Here, description of Steps S501 to S505 and S515 to S525 shown in FIG. 18 is the same as description of Steps S401 to S405 and S415 to S425 described with reference to FIG. 17. Thus, only Steps S507 to S513 will be described here.

The macro base station 100 transmits a handover request message for special handover to the small base station 200 (S507). Then, the small base station 200 performs admission control with respect to the small cell 20 (S509). In addition, the small base station 200 transmits a handover request ACK message to the macro base station 100 (S511). The handover request ACK message does not include an RRC connection reconfiguration message for execution of the special handover.

In addition, the small base station 200 transmits an RRC connection reconfiguration message for execution of the special handover to the terminal device 300 using downlink CCs of the small cell 20 (that is, new downlink PCCs after execution of the special handover) (S513).

6. APPLICATION EXAMPLES

The technology according to the present disclosure is applicable to a variety of products. For example, the base station (the macro base station 100 or the small base station 200) according to an embodiment of the present disclosure may be implemented as any type of eNB. The macro base station 100 may be implemented as a macro eNB, while the small base station 200 may be implemented as a small eNB. Small eNBs may be, for example, pico eNBs, micro eNBs, or home (femto) eNBs that cover smaller cells than the macro cells. Instead, the base station according to an embodiment of the present disclosure may be implemented as another type of base station such as a NodeB or a base transceiver stations (BTS). The base station according to an embodiment of the present disclosure may include a main device (which is also referred to as a base station device) that controls wireless communication and one or more remote radio heads (RRHs) that are arranged at different places from that of the main device. Various types of terminal devices as discussed later may temporarily or semi-persistently execute the base station function to function as the base station according to an embodiment of the present disclosure.

The terminal device 300 may be implemented as a mobile terminal such as a smartphone, a tablet personal computer (PC), a notebook PC, a portable game terminal, a portable/dongle mobile router, or a digital camera, or an in-vehicle terminal such as a car navigation device. The terminal device 300 may also be implemented as a terminal (which is also referred to as a machine type communication (MTC) terminal) that performs machine to machine (M2M) communication. Furthermore, at least a part of the constituent elements of the terminal device 300 may be implemented as a module (e.g. integrated circuit module configured on a single die) that is mounted on these kinds of terminals.

<6.1. Application Example for a Base Station>

First Application Example

Figure 19:
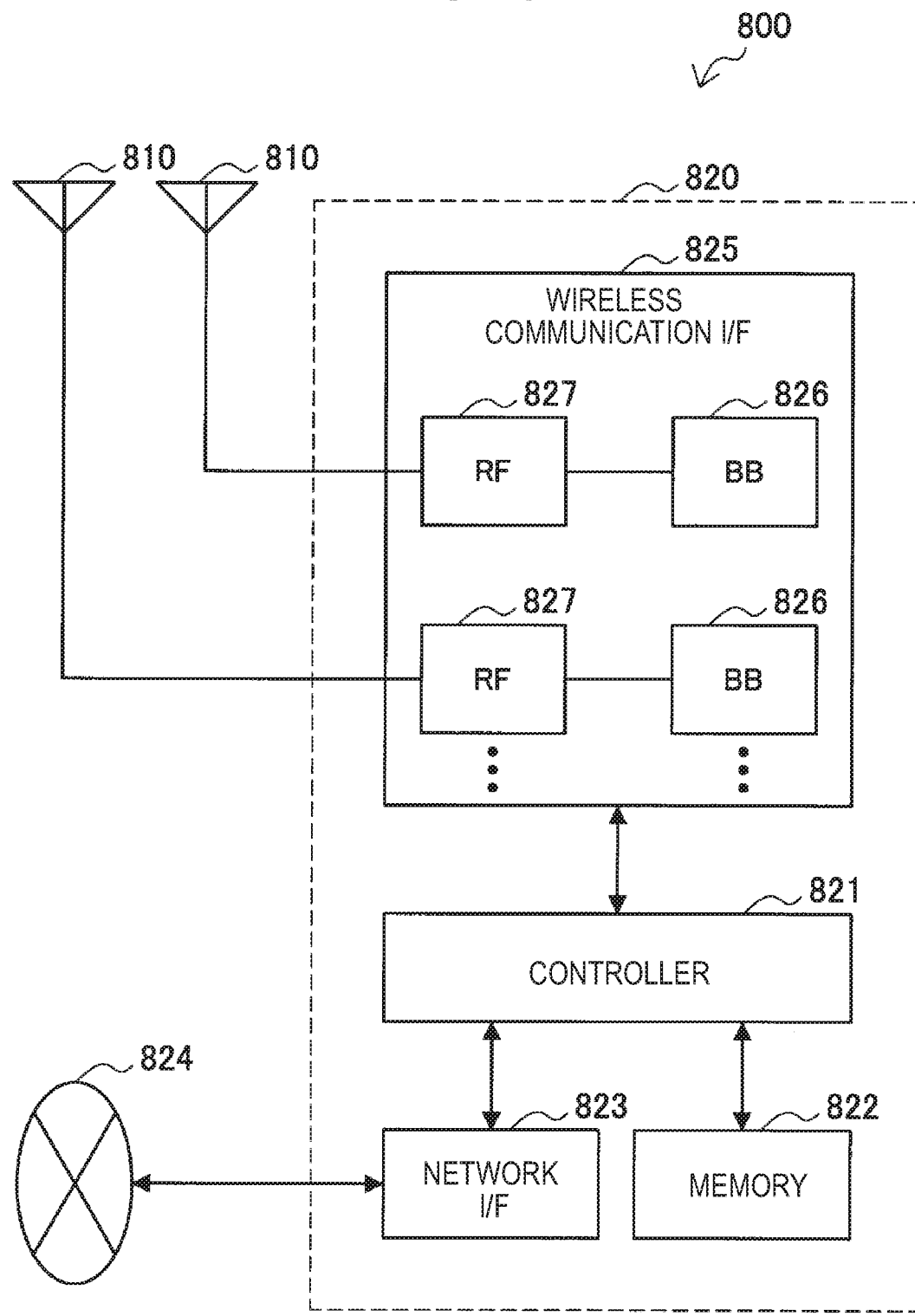
FIG. 19 is a block diagram showing a first example of a schematic configuration of an eNB.

FIG. 19 is a block diagram showing a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g. antenna elements included in a MIMO antenna) and is used for the base station device 820 to transmit and receive a wireless signal. The eNB 800 may include the plurality of the antennas 810 as shown in FIG. 19, and the plurality of antennas 810 may, for example, correspond to a plurality of frequency bands used by the eNB 800. FIG. 19 illustrates an example in which the eNB 800 includes the plurality of antennas 810, but the eNB 800 may include a single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, or scheduling. The control may be performed in cooperation with a surrounding eNB or a core network. The memory 822 includes a RAM and a ROM, and stores a program executed by the controller 821 and a variety of control data (e.g. a terminal list, transmission power data, and scheduling data).

The network interface 823 is a communication interface for connecting the base station device 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides a wireless connection to a terminal positioned within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have a part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or a blade to be inserted into a slot of the base station device 820, or a chip mounted on the card or the blade. Meanwhile, the RF circuit 827 may include a mixer, a filter, an amplifier, and the like, and transmits and receives a radio signal via the antenna 810.

The wireless communication interface 825 may include a plurality of BB processors 826 as shown in FIG. 19, and the plurality of BB processors 826 may, for example, correspond to a plurality of frequency bands used by the eNB 800. The wireless communication interface 825 also may include a plurality of RF circuits 827, as shown in FIG. 19, and the plurality of RF circuits 827 may, for example, correspond to a plurality of antenna elements. FIG. 19 illustrates an example in which the wireless communication interface 825 includes the plurality of BB processors 826 and the plurality of RF circuits 827, but the wireless communication interface 825 may include a single BB processor 826 or a single RF circuit 827.

In the eNB 800 shown in FIG. 19, the information acquisition unit 151 and the communication control unit 153 described with reference to FIG. 11 may be implemented in the wireless communication interface 825. Alternatively, at least a part of these constituent elements may be implemented in the controller 821. As an example, a module that includes a part or all of the wireless communication interface 825 (for example, the BB processors 826) and/or the controller 821 may be mounted in the eNB 800, and the information acquisition unit 151 and the communication control unit 153 may be implemented in the module. In this case, the module may store a program that causes a processor to function as the information acquisition unit 151 and the communication control unit 153 (in other words, a program that causes a processor to execute the operations of the information acquisition unit 151 and the communication control unit 153), and execute the program. As another example, a program that causes a processor to function as the information acquisition unit 151 and the communication control unit 153 may be installed in the eNB 800, and the wireless communication interface 825 (for example, the BB processor 826) and/or the controller 821 may execute the program. As described above, the eNB 800, the base station device 820, or the module may be provided as a device provided with the information acquisition unit 151 and the communication control unit 153, and a program that causes a processor to function as the information acquisition unit 151 and the communication control unit 153 may be provided. In addition, a readable storage medium in which the program is stored may be provided. It can be said that these points are the same for the information acquisition unit 251 and the communication control unit 253 described with reference to FIG. 15.

In addition, the wireless communication unit 120 described with reference to FIG. 11 may be implemented in the wireless communication interface 825 (for example, the RF circuit 827) in the eNB 800 shown in FIG. 19. In addition, the antenna unit 110 may be implemented in the antennas 810. In addition, the network communication unit 130 may be implemented in the controller 821 and/or the network interface 823. It can be said that these points are the same for the antenna unit 210, the wireless communication unit 220, and the network communication unit 230 described with reference to FIG. 15.

Second Application Example

Figure 20:
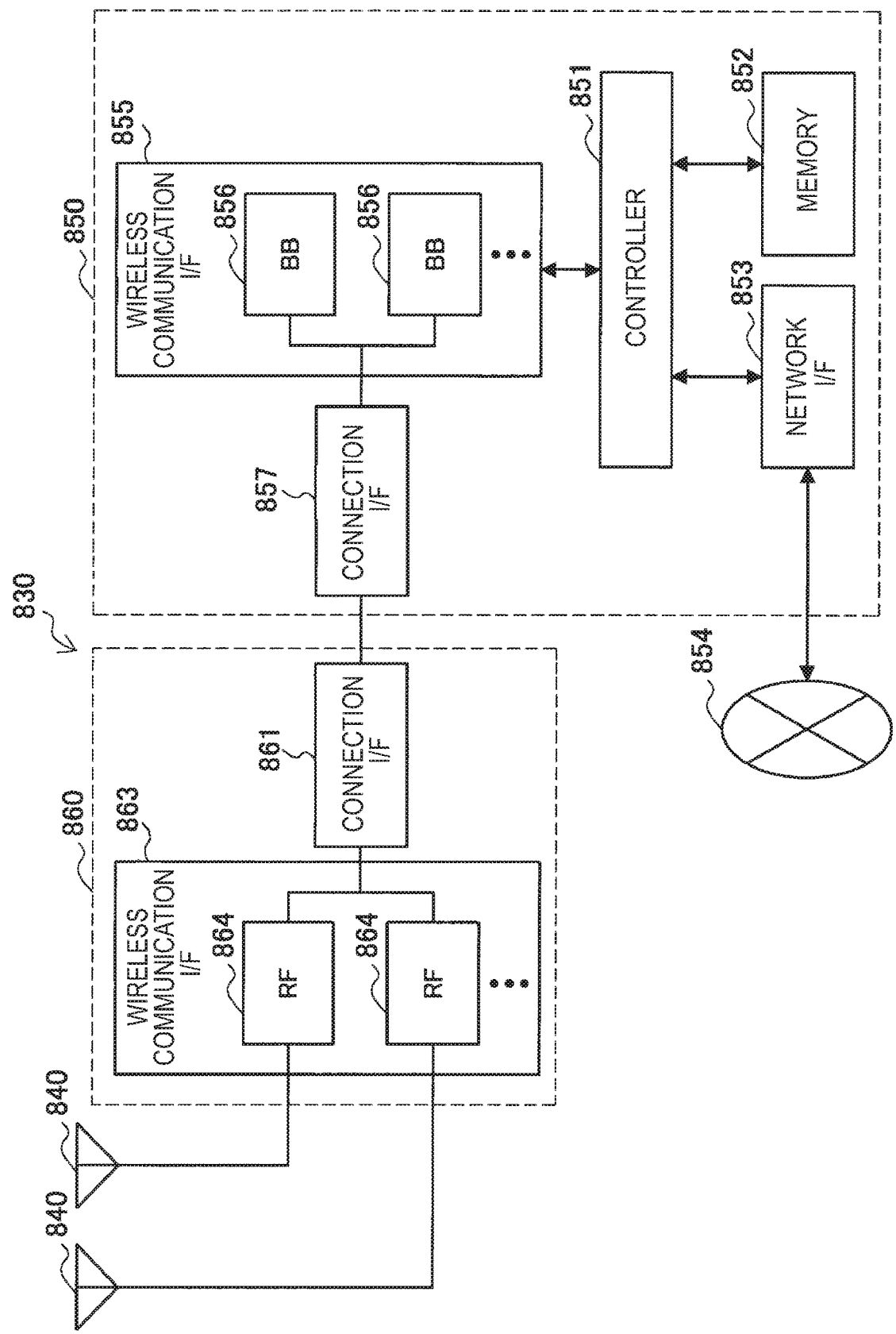
FIG. 20 is a block diagram showing a second example of a schematic configuration of an eNB.

FIG. 20 is a block diagram showing a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. The base station device 850 and the RRH 860 may be connected to each other by a high speed line such as optical fiber cables.

Each of the antennas 840 includes a single or a plurality of antenna elements (e.g. antenna elements included in a MIMO antenna), and is used for the RRH 860 to transmit and receive a wireless signal. The eNB 830 may include a plurality of the antennas 840 as shown in FIG. 20, and the plurality of antennas 840 may, for example, correspond to a plurality of frequency bands used by the eNB 830. FIG. 20 illustrates an example in which the eNB 830 includes the plurality of antennas 840, but the eNB 830 may include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 19.

The wireless communication interface 855 supports a cellular communication system such as LTE or LTE-Advanced, and provides a wireless connection to a terminal positioned in a sector corresponding to the RRH 860 via the RRH 860 and the antenna 840. The wireless communication interface 855 may typically include a BB processor 856. The BB processor 856 is the same as the BB processor 826 described with reference to FIG. 19 except that the BB processor 856 is connected to an RF circuit 864 of the RRH 860 via the connection interface 857. The wireless communication interface 855 may include a plurality of the BB processors 856, as shown in FIG. 20, and the plurality of BB processors 856 may, for example, correspond to a plurality of frequency bands used by the eNB 830 respectively. FIG. 20 illustrates an example in which the wireless communication interface 855 includes the plurality of BB processors 856, but the wireless communication interface 855 may include a single BB processor 856.

The connection interface 857 connects the base station device 850 (wireless communication interface 855) to the RRH 860. The connection interface 857 may be a communication module for communication on the high speed line which connects the base station device 850 (wireless communication interface 855) to the RRH 860.

The RRH 860 includes a connection interface 861 and a wireless communication interface 863.

The connection interface 861 connects the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of RF circuits 864 as shown in FIG. 20, and the plurality of RF circuits 864 may, for example, correspond to a plurality of antenna elements. FIG. 20 illustrates an example in which the wireless communication interface 863 includes the plurality of RF circuits 864, but the wireless communication interface 863 may include a single RF circuit 864.

In the eNB 830 shown in FIG. 20, the information acquisition unit 151 and the communication control unit 153 described with reference to FIG. 11 may be implemented in the wireless communication interface 855 and/or the wireless communication interface 863. Alternatively, at least a part of these constituent elements may be implemented in the controller 851. As an example, a module that includes a part or all of the wireless communication interface 855 (for example, the BB processors 856) and/or the controller 851 may be mounted in the eNB 830, and the information acquisition unit 151 and the communication control unit 153 may be implemented in the module. In this case, the module may store a program that causes a processor to function as the information acquisition unit 151 and the communication control unit 153 (in other words, a program that causes a processor to execute the operations of the information acquisition unit 151 and the communication control unit 153), and execute the program. As another example, a program that causes a processor to function as the information acquisition unit 151 and the communication control unit 153 may be installed in the eNB 830, and the wireless communication interface 855 (for example, the BB processor 856) and/or the controller 851 may execute the program. As described above, the eNB 830, the base station device 850, or the module may be provided as a device provided with the information acquisition unit 151 and the communication control unit 153, and a program that causes a processor to function as the information acquisition unit 151 and the communication control unit 153 may be provided. In addition, a readable storage medium in which the program is stored may be provided. It can be said that these points are the same for the information acquisition unit 251 and the communication control unit 253 described with reference to FIG. 15.

In addition, the wireless communication unit 120 described, for example, with reference to FIG. 11 may be implemented in the wireless communication interface 863 (for example, the RF circuit 864) in the eNB 830 shown in FIG. 20. In addition, the antenna unit 110 may be implemented in the antennas 840. In addition, the network communication unit 130 may be implemented in the controller 851 and/or the network interface 853. It can be said that these points are the same for the antenna unit 210, the wireless communication unit 220, and the network communication unit 230 described with reference to FIG. 15.

<6.2. Application Example for a Terminal Device>

First Application Example

Figure 21:
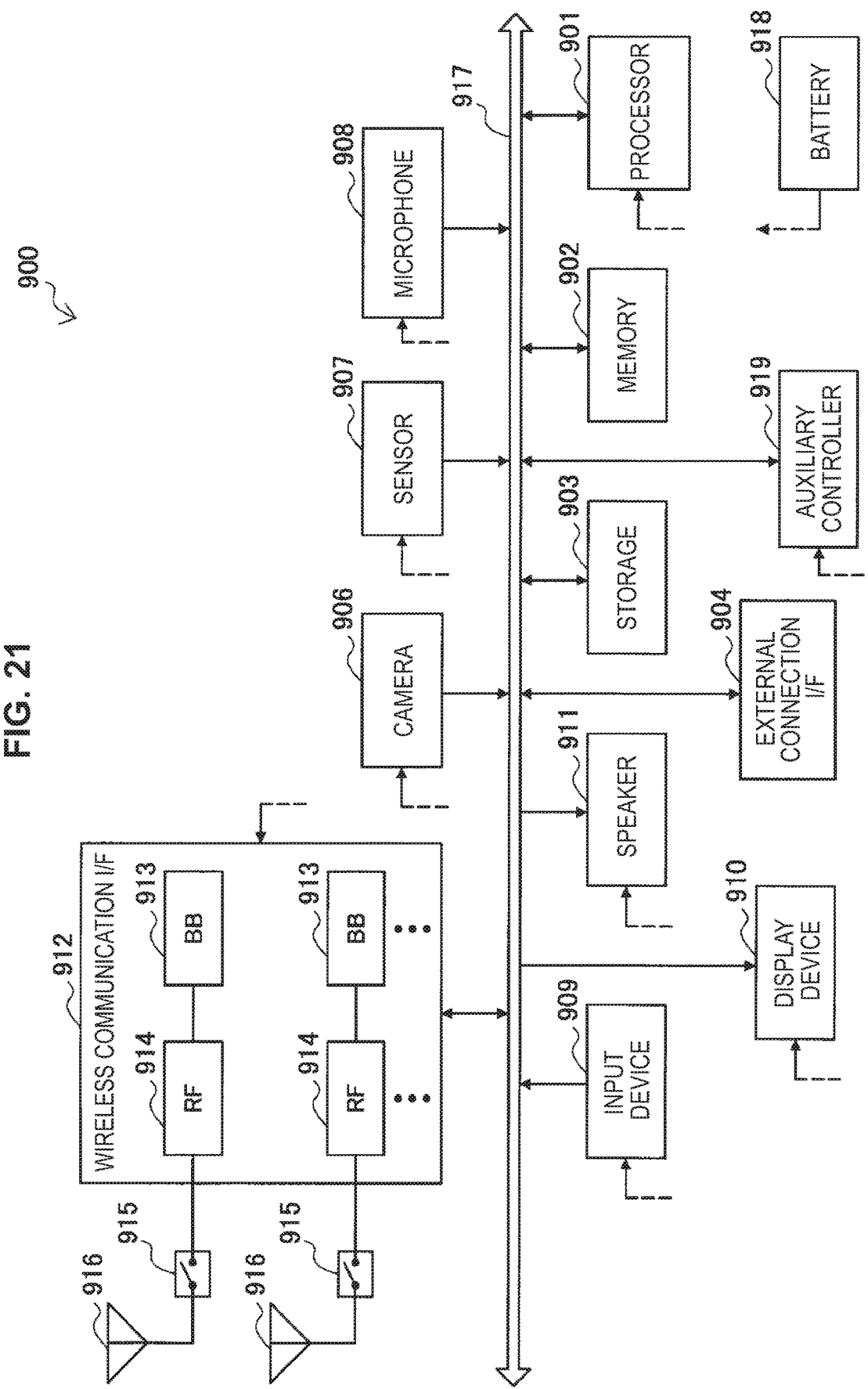
FIG. 21 is a block diagram showing an example of a schematic configuration of a smartphone.

FIG. 21 is a block diagram showing an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and another layer of the smartphone 900. The memory 902 includes a RAM and a ROM, and stores a program executed by the processor 901 and data. The storage 903 may include a storage medium such as a semiconductor memory or a hard disk. The external connection interface 904 connects the smartphone 900 to an externally attached device such as a memory card or a Universal Serial Bus (USB) device.

The camera 906 includes an image sensor such as a charge coupled device (CCD) or a complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and receives an operation or an information input from a user. The display device 910 includes a screen such as a liquid crystal display (LCD) or an organic light emitting diode (OLED) display, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include a BB processor 913 and an RF circuit 914. The BB processor 913 may, for example, perform encoding/decoding, modulation/demodulation, multiplexing/demultiplexing, and the like, and executes a variety of signal processing for wireless communication. Meanwhile, the RF circuit 914 may include a mixer, a filter, and an amplifier, and transmits and receives a wireless signal via the antenna 916. The wireless communication interface 912 may be a one-chip module having the BB processor 913 and the RF circuit 914 integrated thereon. The wireless communication interface 912 may include a plurality of BB processors 913 and a plurality of RF circuits 914 as shown in FIG. 21. FIG. 21 illustrates an example in which the wireless communication interface 912 includes the plurality of BB processors 913 and the plurality of RF circuits 914, but the wireless communication interface 912 may also include a single BB processor 913 or a single RF circuit 914.

Furthermore, the wireless communication interface 912 may support another type of wireless communication scheme such as a short-distance wireless communication scheme, a near field communication scheme, or wireless local area network (LAN) scheme in addition to cellular communication systems, and in that case, the wireless communication interface 912 may include a BB processor 913 and an RF circuit 914 for each wireless communication scheme.

Each of the antenna switches 915 switches a plurality of circuits (e.g. circuits for different wireless communication schemes) included in the wireless communication interface 912 to which the antennas 916 connect.

Each of the antennas 916 includes a single or a plurality of antenna elements (e.g. antenna elements included in an MIMO antenna), and is used for the wireless communication interface 912 to transmit and receive a wireless signal. The smartphone 900 may include the plurality of antennas 916 as shown in FIG. 21. FIG. 21 illustrates an example in which the smartphone 900 includes the plurality of antennas 916, but the smartphone 900 may also include a single antenna 916.

Furthermore, the smartphone 900 may include the antennas 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 shown in FIG. 21 via feeder lines that are partially illustrated in the figure as dashed lines. The auxiliary controller 919, for example, operates a minimally necessary function of the smartphone 900 in a sleep mode.

In the smartphone 900 shown in FIG. 21, the information acquisition unit 341 and the communication control unit 343 described with reference to FIG. 16 may be implemented in the wireless communication interface 912. Alternatively, at least a part of these constituent elements may be implemented in the processor 901 or the auxiliary controller 919. As an example, a module that includes a part or all of the wireless communication interface 912 (for example, the BB processors 913), the processor 901 and/or the auxiliary controller 919 may be mounted in the smartphone 900, and the information acquisition unit 341 and the communication control unit 343 may be implemented in the module. In this case, the module may store a program that causes a processor to function as the information acquisition unit 341 and the communication control unit 343 (in other words, a program that causes a processor to execute the operations of the information acquisition unit 341 and the communication control unit 343), and execute the program. As another example, a program that causes a processor to function as the information acquisition unit 341 and the communication control unit 343 may be installed in the smartphone 900, and the wireless communication interface 912 (for example, the BB processor 913), the processor 901 and/or the auxiliary controller 919 may execute the program. As described above, the smartphone 900 or the module may be provided as a device provided with the information acquisition unit 341 and the communication control unit 343, and a program that causes a processor to function as the information acquisition unit 341 and the communication control unit 343 may be provided. In addition, a readable storage medium in which the program is stored may be provided.

In addition, in the smartphone 900 shown in FIG. 21, for example, the wireless communication unit 320 described with reference to FIG. 16 may be implemented in the wireless communication interface 912 (for example, the RF circuit 914). In addition, the antenna unit 310 may be implemented in the antennas 916.

Second Application Example

FIG. 22 is a block diagram showing an example of a schematic configuration of a car navigation device 920 to which the technology according to the present disclosure may be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation device 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation device 920. The sensor 925 may include a sensor group including, for example, a gyro sensor, a geomagnetic sensor, and an air pressure sensor. The data interface 926 is, for example, connected to an in-vehicle network 941 via a terminal that is not shown, and acquires data such as car speed data generated on the vehicle.

The content player 927 reproduces content stored in a storage medium (e.g. a CD or a DVD) inserted into the storage medium interface 928. The input device 929 includes, for example, a touch sensor which detects touches of a screen of the display device 930, a button, or a switch, and receives an operation or an information input from a user. The display device 930 includes a screen such as an LCD or an OLED display, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include a BB processor 934 and an RF circuit 935. The BB processor 934 may, for example, perform encoding/decoding, modulation/demodulation, multiplexing/demultiplexing, and the like, and executes a variety of signal processing for wireless communication. Meanwhile, the RF circuit 935 may include a mixer, a filter, and an amplifier, and transmits and receives a wireless signal via the antenna 937. The wireless communication interface 933 may be a one-chip module having the BB processor 934 and the RF circuit 935 integrated thereon. The wireless communication interface 933 may include a plurality of BB processors 934 and a plurality of RF circuits 935 as shown in FIG. 22. FIG. 22 illustrates an example in which the wireless communication interface 933 includes the plurality of BB processors 934 and the plurality of RF circuits 935, but the wireless communication interface 933 may also include a single BB processor 934 or a single RF circuit 935.

Furthermore, the wireless communication interface 933 may support another type of wireless communication scheme such as short-distance wireless communication schemes, near field communication schemes, and wireless LAN schemes in addition to cellular communication systems, and in that case, the wireless communication interface 912 may include the BB processor 934 and the RF circuit 935 for each wireless communication scheme.

Each of the antenna switches 936 switches a plurality of circuits (e.g. circuits for different wireless communication schemes) included in the wireless communication interface 933 to which the antennas 937 connect.

Each of the antennas 937 includes a single or a plurality of antenna elements (e.g. antenna elements included in an MIMO antenna), and is used for the wireless communication interface 933 to transmit and receive a wireless signal. The car navigation device 920 may include the plurality of antennas 937 as shown in FIG. 22. FIG. 22 illustrates an example in which the car navigation device 920 includes the plurality of antennas 937, but the car navigation device 920 may also include a single antenna 937.

Furthermore, the car navigation device 920 may include the antennas 937 for each wireless communication scheme. In that case, the antenna switches 936 may be omitted from the configuration of the car navigation device 920.

The battery 938 supplies electric power to each block of the car navigation device 920 shown in FIG. 22 via feeder lines that are partially illustrated in the figure as dashed lines. The battery 938 accumulates the electric power supplied from the vehicle.

In the car navigation device 920 shown in FIG. 22, the information acquisition unit 341 and the communication control unit 343 described with reference to FIG. 16 may be implemented in the wireless communication interface 933. Alternatively, at least a part of these constituent elements may be implemented in the processor 921. As an example, a module that includes a part or all of the wireless communication interface 933 (for example, the BB processors 934) and/or the processor 921 may be mounted in the car navigation device 920, and the information acquisition unit 341 and the communication control unit 343 may be implemented in the module. In this case, the module may store a program that causes a processor to function as the information acquisition unit 341 and the communication control unit 343 (in other words, a program that causes a processor to execute the operations of the information acquisition unit 341 and the communication control unit 343), and execute the program. As another example, a program that causes a processor to function as the information acquisition unit 341 and the communication control unit 343 may be installed in the car navigation device 920, and the wireless communication interface 933 (for example, the BB processor 934) and/or the processor 921 may execute the program. As described above, the car navigation device 920 or the module may be provided as a device provided with the information acquisition unit 341 and the communication control unit 343, and a program that causes a processor to function as the information acquisition unit 341 and the communication control unit 343 may be provided. In addition, a readable storage medium in which the program is stored may be provided.

In addition, in the car navigation device 920 shown in FIG. 22, for example, the wireless communication unit 320 described with reference to FIG. 16 may be implemented in the wireless communication interface 933 (for example, the RF circuit 935). In addition, the antenna unit 310 may be implemented in the antennas 937.

In addition, the technology according to the present disclosure may be implemented as an in-vehicle system (or vehicle) 940 including one or more blocks of the car navigation device 920, the in-vehicle network 941, and a vehicle module 942. That is, the in-vehicle system (or vehicle) 940 may be provided as a device provided with the information acquisition unit 341 and the communication control unit 343. The vehicle module 942 generates vehicle data such as car speed, engine speed, and trouble information, and outputs the generated data to the in-vehicle network 941.

7. CONCLUSION

Devices and processes according to embodiments of the present disclosure have been described with reference to FIGS. 1 to 22.

According to the embodiment of the present disclosure, the macro base station 100 is provided with the information acquisition unit 151 that acquires a measurement result reported by the terminal device 300 using uplink CCs and downlink CCs of the macrocell 10 as uplink PCCs and downlink PCCs for the terminal device 300, and the communication control unit 153 that decides, based on the measurement result, handover in which at least one of the uplink PCCs and the downlink PCCs is changed. The communication control unit 153 decides handover in which the downlink PCCs are changed from the downlink CCs of the macrocell 10 to downlink CCs of the small cell 20 without changing the uplink PCCs (that is, special handover) when a predetermined condition is satisfied.

Accordingly, for example, consumption of radio resources of the macrocell 10 can be reduced more. More specifically, for example, even if the small cell 20 is a cell in which only downlink CCs can be used, the downlink PCCs for the terminal device 300 can be the downlink CCs of the small cell 20. Thus, consumption of radio resources in downlink of the macrocell 10 can be reduced.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although an example in which the communication system is a system that is compliant with LTE, LTE-Advanced, or a communication scheme that conforms to them is described, the present disclosure is not limited to such an example. For example, the communication system may be a system that conforms to another communication standard.

Processing steps in the processing described herein do not necessarily have to be performed in the chronological order described in the flowcharts or sequence diagrams. For example, the processing steps in the processing may be performed in order different from the order described as the flowcharts or sequence diagrams, or may be performed in parallel.

In addition, a computer program for causing a processor (for example, a CPU, a DSP, or the like) provided in the device of the present specification (a macro base station, a small base station, or a terminal device) to function as constituent elements of the device (for example, the information acquisition unit, the communication control unit, and the like) (in other words, a computer program for causing the processor to execute operations of the constituent elements of the device) can also be created. In addition, a storage medium in which the computer program is stored may also be provided. In addition, a device provided with a memory that stores the computer program and one or more processors that can execute the computer program (for example, a finished product, or a module for a finished product (a part, a processing circuit, a chip, or the like)) may also be provided. In addition, a method including operations of the constituent elements (for example, the information acquisition unit, the communication control unit, and the like) of the device is also included in the technology according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A device including:

an acquisition unit configured to acquire a measurement result reported by a terminal device using an uplink component carrier (CC) and a downlink CC of a macrocell as an uplink primary component carrier (PCC) and a downlink PCC for the terminal device; and a control unit configured to decide handover in which at least one of the uplink PCC and the downlink PCC is changed based on the measurement result, wherein the control unit decides handover in which the downlink PCC is changed from the downlink CC of the macrocell to a downlink CC of a small cell without changing the uplink PCC when a predetermined condition is satisfied.

(2)

The device according to (1), wherein the predetermined condition includes that a predetermined message is transmitted from the terminal device to a base station of the macrocell.

(3)

The device according to (2), wherein the predetermined message includes a message indicating that mobility of the terminal device is low.

(4)

The device according to (2) or (3), wherein the predetermined message includes a message indicating that the terminal device prefers low power consumption.

(5)

The device according to any one of (2) to (4), wherein the macrocell is a cell in which Multimedia Broadcast Multicast Services (MBMS) services are not provided, the small cell is a cell in which the MBMS services are provided, and the predetermined message includes a message indicating that the terminal device prioritizes reception of the MBMS over reception of unicast.

(6)

The device according to any one of (1) to (5), wherein the control unit does not use the downlink CC of the macrocell for wireless communication with the terminal device after execution of the handover in which the downlink PCC is changed without changing the uplink PCC.

(7)

The device according to any one of (1) to (5), wherein the control unit uses the downlink CC of the macrocell as a downlink secondary component carrier (SCC) for the terminal device for wireless communication with the terminal device after execution of the handover in which the downlink PCC is changed without changing the uplink PCC.

(8)

The device according to any one of (1) to (7), wherein the control unit controls transmission of a message for execution of the handover in which the downlink PCC is changed without changing the uplink PCC to the terminal device.

(9)

The device according to (8), wherein the message is a radio resource control (RRC) connection reconfiguration message.

(10)

The device according to any one of (1) to (9), wherein the device is a base station of the macrocell, a base station device for the base station, or a module for the base station device.

(11)

A device including:

a control unit configured to control transmission of a message for execution of handover in which a downlink PCC for a terminal device is changed from a downlink CC of a macrocell to a downlink CC of a small cell without changing an uplink PCC for the terminal device from an uplink CC of the macrocell to the terminal device.

(12)

The device according to (11), wherein the device is a base station of the small cell, a base station device for the base station, or a module for the base station device.

(13)

The device according to (12), wherein the control unit controls transmission of the message to the terminal device so that the message is transmitted to the terminal device within a predetermined period using the downlink CC of the small cell.

(14)

The device according to (11), wherein the device is a base station of the macrocell, a base station device for the base station, or a module for the base station device.

(15)

The device according to any one of (1) to (14), wherein the small cell is a cell in which only a downlink CC is usable.

(16)

A device including:

an acquisition unit configured to acquire a message for execution of handover in which a downlink PCC for a terminal device is changed from a downlink CC of a macrocell to a downlink CC of a small cell without changing an uplink PCC for the terminal device from an uplink CC of the macrocell, the message being transmitted from a base station to the terminal device; and a control unit configured to use the uplink CC of the macrocell as the uplink PCC and use the downlink CC of the small cell as the downlink PCC after execution of the handover.

(17)

The device according to (16), wherein the control unit does not use the downlink CC of the macrocell for wireless communication with a base station of the macrocell after execution of the handover.

(18)

The device according to (17), wherein the control unit uses the downlink CC of the macrocell as a downlink SCC for the terminal device for wireless communication with a base station of the macrocell after execution of the handover.

(19)

The device according to any one of (1) to (18), wherein the control unit generates a message indicating whether mobility of the terminal device is low, and controls transmission of the message to a base station of the macrocell.

(20)

The device according to any one of (16) to (19), wherein the device is the terminal device or a module for the terminal device.

(21)
A method including:
acquiring a measurement result reported by a terminal device using an uplink CC and a downlink CC of a macrocell as an uplink PCC and a downlink PCC for the terminal device; and
deciding, by a processor, handover in which at least one of the uplink PCC and the downlink PCC is changed based on the measurement result,
wherein the deciding handover includes deciding handover in which the downlink PCC is changed from the downlink CC of the macrocell to a downlink CC of a small cell without changing the uplink PCC when a predetermined condition is satisfied.

(22)
A program for causing a processor to execute:
acquiring a measurement result reported by a terminal device using an uplink CC and a downlink CC of a macrocell as an uplink PCC and a downlink PCC for the terminal device; and
deciding handover in which at least one of the uplink PCC and the downlink PCC is changed based on the measurement result,
wherein the deciding handover includes deciding handover in which the downlink PCC is changed from the downlink CC of the macrocell to a downlink CC of a small cell without changing the uplink PCC when a predetermined condition is satisfied.

(23)
A readable recording medium having a program recorded thereon, the program causing a processor to execute:
acquiring a measurement result reported by a terminal device using an uplink CC and a downlink CC of a macrocell as an uplink PCC and a downlink PCC for the terminal device; and
deciding handover in which at least one of the uplink PCC and the downlink PCC is changed based on the measurement result,
wherein the deciding handover includes deciding handover in which the downlink PCC is changed from the downlink CC of the macrocell to a downlink CC of a small cell without changing the uplink PCC when a predetermined condition is satisfied.

(24)
A method including:
controlling, by a processor, transmission of a message for execution of handover in which a downlink PCC for a terminal device is changed from a downlink CC of a macrocell to a downlink CC of a small cell without changing an uplink PCC for the terminal device from an uplink CC of the macrocell to the terminal device.

(25)
A program for causing a processor to execute:
controlling transmission of a message for execution of handover in which a downlink PCC for a terminal device is changed from a downlink CC of a macrocell to a downlink CC of a small cell without changing an uplink PCC for the terminal device from an uplink CC of the macrocell to the terminal device.

(26)
A readable recording medium having a program recorded thereon, the program causing a processor to execute:
controlling transmission of a message for execution of handover in which a downlink PCC for a terminal device is changed from a downlink CC of a macrocell to a downlink CC of a small cell without changing an uplink PCC for the terminal device from an uplink CC of the macrocell to the terminal device.

(27)
A method including:
acquiring a message for execution of handover in which a downlink PCC for a terminal device is changed from a downlink CC of a macrocell to a downlink CC of a small cell without changing an uplink PCC for the terminal device from an uplink CC of the macrocell, the message being transmitted from a base station to the terminal device; and
using, by a processor, the uplink CC of the macrocell as the uplink PCC and use the downlink CC of the small cell as the downlink PCC after execution of the handover.

(28)
A program for causing a processor to execute:
acquiring a message for execution of handover in which a downlink PCC for a terminal device is changed from a downlink CC of a macrocell to a downlink CC of a small cell without changing an uplink PCC for the terminal device from an uplink CC of the macrocell, the message being transmitted from a base station to the terminal device; and
using the uplink CC of the macrocell as the uplink PCC and use the downlink CC of the small cell as the downlink PCC after execution of the handover.

(29)
A readable recording medium having a program recorded thereon, the program causing a processor to execute:
acquiring a message for execution of handover in which a downlink PCC for a terminal device is changed from a downlink CC of a macrocell to a downlink CC of a small cell without changing an uplink PCC for the terminal device from an uplink CC of the macrocell, the message being transmitted from a base station to the terminal device; and
using the uplink CC of the macrocell as the uplink PCC and use the downlink CC of the small cell as the downlink PCC after execution of the handover.

REFERENCE SIGNS LIST 1 communication system
10 macrocell
20 small cell
30 uplink band for a macrocell
40 downlink band for a macrocell
50 downlink band for a small cell
100 macro base station
151 information acquisition unit
153 communication control unit
200 small base station
251 information acquisition unit
253 communication control unit
300 terminal device
341 information acquisition unit
343 communication control unit

The invention claimed is:
1. A first device, comprising:
at least one processor configured to:
acquire a measurement result from a second device, via an uplink component carrier (CC) of a macrocell and a downlink CC of the macrocell, wherein
the uplink CC of the macrocell corresponds to an uplink primary component carrier (PCC) for the second device,
the downlink CC of the macrocell corresponds to a downlink PCC for the second device, and the measurement result comprises a Reference Signal Received Power (RSRP) of the downlink CC of the macrocell and an RSRP of a downlink CC of a small cell;

acquire a first message from the second device; and determine an execution of a handover of the second device, wherein the handover corresponds to a process in which:
the downlink PCC for the second device is changed from the downlink CC of the macrocell to the downlink CC of the small cell, and the uplink PCC for the second device remains unchanged from the uplink CC of the macrocell after the change of the downlink PCC for the second device from the macrocell to the small cell, the uplink PCC for the second device remains unchanged from the uplink CC of the macrocell based on the first message that indicates that the second device prioritizes reception of Multimedia Broadcast Multicast Services (MBMS) services over reception of unicast services, the determination of the execution of the handover is based on:
the first message that indicates that the second device prioritizes the reception of the MBMS services over the reception of the unicast services, and a difference between the RSRP of the downlink CC of the macrocell and the RSRP of the downlink CC of the small cell, wherein the difference exceeds a determined threshold value.

2. The first device according to claim 1, wherein the MBMS services are absent in the macrocell, and the MBMS services are in the small cell.

3. The first device according to claim 1, wherein the at least one processor is further configured to wirelessly communicate with the second device, without utilization of the downlink CC of the macrocell, based on the execution of the handover.

4. The first device according to claim 1, wherein the at least one processor is further configured to wirelessly communicate with the second device, by utilization of the downlink CC of the macrocell as a downlink secondary component carrier (SCC) for the second device, based on the execution of the handover.

5. The first device according to claim 1, wherein the at least one processor is further configured to transmit a second message to the second device for the execution of the handover.

6. The first device according to claim 5, wherein the second message is a radio resource control (RRC) connection reconfiguration message.

7. The first device according to claim 1, wherein the first device is one of a base station of the macrocell, a base station device for the base station, or a module for the base station device.

8. The first device according to claim 1, wherein the downlink CC of the small cell is usable.

9. The first device according to claim 1, wherein the at least one processor is further configured to acquire the first message based on a user instruction.

10. The first device according to claim 1, wherein the at least one processor is further configured to deactivate the downlink CC of the macrocell via one of a MAC control element or a radio resource control (RRC) connection reconfiguration message.

11. A first device, comprising:
at least one processor configured to:
control transmission of a message based on a determination of an execution of a handover of a second device, wherein
the handover corresponds to a process in which:
a downlink primary component carrier (PCC) for the second device is changed from a downlink component carrier (CC) of a macrocell to a downlink CC of a small cell, and an uplink PCC for the second device remains unchanged from an uplink CC of the macrocell after the change of the downlink PCC for the second device from the macrocell to the small cell, the uplink PCC for the second device remains unchanged from the uplink CC of the macrocell based on the transmission of the message that indicates that the second device prioritizes reception of Multimedia Broadcast Multicast Services (MBMS) services over reception of unicast services, the uplink CC of the macrocell corresponds to the uplink PCC for the second device, the downlink CC of the macrocell corresponds to the downlink PCC for the second device before the execution of the handover, the determination of the execution of the handover is based on a difference between a Reference Signal Received Power (RSRP) of the downlink CC of the macrocell and an RSRP of the downlink CC of the small cell, and the difference exceeds a determined threshold value.

12. The first device according to claim 11, wherein the first device is one of a base station of the small cell, a base station device for the base station, or a module for the base station device.

13. The first device according to claim 12, wherein the at least one processor is further configured to control the transmission of the message to the second device by utilization of the downlink CC of the small cell such that the message is transmitted to the second device within a specific time period.

14. A first device, comprising:
at least one processor configured to:
generate a first message that indicates that the first device prioritizes reception of Multimedia Broadcast Multicast Services (MBMS) services over reception of unicast services;

acquire a second message transmitted from a second device for execution of a handover of the first device, wherein
an uplink component carrier (CC) of a macrocell corresponds to an uplink primary component carrier (PCC) for the first device, a downlink CC of the macrocell corresponds to a downlink PCC for the first device, the handover corresponds to a process in which:
the downlink PCC for the first device is changed from the downlink CC of the macrocell to a downlink CC of a small cell, and the uplink PCC for the first device remains unchanged from the uplink CC of the macrocell after the change of the downlink PCC for the first device from the macrocell to the small cell,
the uplink PCC for the first device remains unchanged from the uplink CC of the macrocell based on the first message that indicates that the first device prioritizes the reception of the MBMS services over the reception of the unicast services,
a determination of the execution of the handover is based on a difference between a Reference Signal Received Power (RSRP) of the downlink CC of the macrocell and a RSRP of the downlink CC of the small cell, and
the difference exceeds a determined threshold value; and
utilize the uplink CC of the macrocell as the uplink PCC and the downlink CC of the small cell as the downlink PCC after the execution of the handover of the first device from the macrocell to the small cell.

15. The first device according to claim 14, wherein the at least one processor is further configured to wirelessly communicate with the second device, without utilization of the downlink CC of the macrocell, after the execution of the handover, and
the second device corresponds to the macrocell.

16. The first device according to claim 15, wherein the at least one processor is further configured to wirelessly communicate with the second device, after the execution of the handover, by utilization of the downlink CC of the macrocell as a downlink secondary component carrier (SCC) for the first device.

17. The first device according to claim 14, wherein the at least one processor is further configured to
control transmission of the first message to the second device.

18. The first device according to claim 14, wherein the first device is one of a terminal device or a module for the terminal device.

19. The first device according to claim 14, wherein the at least one processor is further configured to deactivate the downlink CC of the macrocell, after the acquisition of the first message for the execution of the handover.

* * * * *